(12) United States Patent
Moriguchi et al.

(10) Patent No.: US 6,587,756 B2
(45) Date of Patent: Jul. 1, 2003

(54) COMMUNICATION SYSTEM, VEHICLE-MOUNTED COMMUNICATION SYSTEM, COMMUNICATION DEVICE, AND VEHICLE-MOUNTED DEVICE

(75) Inventors: Kenichi Moriguchi, Osaka (JP); Mitsuru Kitao, Nara (JP); Takeshi Hatakeyama, Hyogo (JP); Toshihiko Kurosaki, Hyogo (JP); Masaaki Tomoda, Osaka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/836,242

(22) Filed: Apr. 18, 2001

(65) Prior Publication Data
US 2002/0007238 A1 Jan. 17, 2002

(30) Foreign Application Priority Data
Apr. 20, 2000 (JP) .......................... 2000-118983

(51) Int. Cl.⁷ ................................. G05D 1/00
(52) U.S. Cl. ................. 701/1; 701/33; 340/438
(58) Field of Search ................ 701/1, 33, 114, 701/117, 101, 102; 340/438, 991, 933

(56) References Cited

U.S. PATENT DOCUMENTS

5,774,817 A * 6/1998 Takagi et al. .................. 701/1
6,112,152 A * 8/2000 Tuttle .......................... 701/115
6,202,008 B1 * 3/2001 Beckert et al. ................ 701/33

FOREIGN PATENT DOCUMENTS

| JP | 10-320339 | 12/1998 |
| JP | 11-95986 | 4/1999 |
| JP | 2000-47748 | 2/2000 |

* cited by examiner

Primary Examiner—William A Cuchlinski, Jr.
Assistant Examiner—Marthe Y. Marc-Coleman
(74) Attorney, Agent, or Firm—Wenderoth, Lind & Ponack, L.L.P.

(57) ABSTRACT

A communication system, a vehicle-mounted communication system, a communication device, and a vehicle-mounted device, which can easily and simultaneously set plural devices which are connected by a network. A communication terminal (server) comprises a storage medium interface to or from which a storage medium can be inserted or removed, and each of a plurality of devices comprises a control means for controlling reading of setting information from the storage medium which has been inserted into the storage medium interface of the communication terminal (server) or writing of the setting information to the storage medium, via a network, and a setting part for setting the self-device on the basis of the setting information read from the storage medium.

46 Claims, 25 Drawing Sheets

| address of communication terminal 11 | |
|---|---|
| directory name | ¥device setting¥car navigator¥maker A¥ |
| file name | model XYZ123 |

| address of communication terminal 11 | |
|---|---|
| database name | device setting information |
| retrieval key | device type="car navigator" |
| | maker="maker A" |
| | model="XYZ123" | to network

COMMUNICATION SYSTEM, VEHICLE-MOUNTED COMMUNICATION SYSTEM, COMMUNICATION DEVICE, AND VEHICLE-MOUNTED DEVICE

FIELD OF THE INVENTION

The present invention relates to communication systems and communication devices for setting plural devices which are connected by a channel and, more particularly, to vehicle-mounted communication systems for controlling a setting operation when vehicle-mounted devices are connected by a network, and vehicle-mounted devices.

BACKGROUND OF THE INVENTION

Conventionally, setting information for a device which is not connected by a network or the like is stored in the device. For example, in the case of a stand-alone CD player, setting information concerning the setting of the volume, sound quality, equalizer and the like of the CD player is commonly stored in a storage means included in the CD player.

Recently, vehicle-mounted devices which have been sophisticated and digitized like car navigation systems, DVD drives, CD changers and the like have come into wide use, and setting information of each device or items which can be configured by the user are being increased. Further, many vehicle-mounted devices are getting to be mounted on vehicles and connected each other.

In these vehicle-mounted network environments, when the setting is to be carried out for plural devices, for example according to respective persons, the setting is carried out manually by the user, but this includes many errors and is troublesome. Further, also when the vehicle-mounted network environments are to be reflected upon vehicle-mounted network environments of another vehicle, the manual setting is the only way and thereby the same problems arise.

As an example of systems working in the network environments, there is a network by computers, while also in the computers, the setting of a computer (setting concerning the user interface, setting of a network parameter and the like) is usually stored in a storage means included in this computer, in many cases. However, in an environment where plural computers are connected by a network, there are also some cases where the setting of client computers is stored in a server computer.

For example, in a "client/server system" disclosed in Japanese Published Patent Application No. Hei.10-320339, in an environment where a server and plural clients are connected, even when a user logs in from a different client computer, the user environment file stored in the server is transmitted to that client computer and the client computer is started up in accordance with the received user environment file. Accordingly, even when the user logs in from any different client computer, the computer can be started up in the same startup environment.

However, in a method disclosed in Japanese Published Patent Application No. Hei.10-320339, the same environment is set for a certain user on different terminals and thus the setting cannot be carried out for each device and each person, in an environment where different devices are connected on the network.

Accordingly, as a method for simplifying the setting for each person in a computer terminal, Japanese Published Patent Application No. 2000-47748 discloses a method for storing a personal setting environment of a personal computer in an IC card and easily setting the personal environment of the personal computer by the IC card.

Hereinafter, the method disclosed in Japanese Published Patent Application No. 2000-47748 is described with reference to FIGS. 27(a) and 27(b). FIGS. 27(a) and 27(b) are diagrams for schematically illustrating personal computers which are started up by IC cards. The computers PC1, PC2, PC3, and PC4 in FIGS. 27(a) and 27(b) are connected to each other and with a network server PC5 through the Ethernet, respectively. The IC cards are possessed by persons, respectively, and for example when the card A is used for the computer PC1 as shown in FIG. 27(a), this computer is started up in the environment of A. Then, when the card A is used for the computer PC4 as shown in FIG. 27(b), this computer is started up in the environment of A.

Accordingly, when the person carries the card, the operation in his environments can be realized in any personal computer.

However, it is necessary to provide a storage means which contains setting information and a storage medium interface corresponding to the storage means, for each device to be set, and for example when the user wants to change the setting environment, the storage means should be changed for each device and it is troublesome.

SUMMARY OF THE INVENTION

It is an object of the present invention to provide communication systems, vehicle-mounted communication systems, communication devices, and vehicle-mounted devices, which can execute setting of devices connected to a channel, only by exchanging storage media.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a communication system in which a first device and a second device are connected by a channel, and the first device and the second device establish communication via the channel, and in this communication system, the first device comprises a storage medium interface to or from which a storage medium can be inserted or removed, and the second device comprises a control means for controlling reading of setting information from the storage medium which has inserted into the storage medium interface of the first device or writing of setting information onto the storage medium, via the channel; and a setting means for carrying out setting of the second device on the basis of the setting information read from the storage medium. Therefore, when the second device establishes the communication with the first device via the channel, it is unnecessary for the user to carry out the setting of each device using a storage medium corresponding to each of the devices connected to the channel, like in the prior art, and the setting of the second device can be easily executed by merely inserting the storage medium into the first device and further when the plural second devices are connected to the channel, the setting of the plural second devices can be simultaneously executed, whereby the operationality of the user is increased.

According to a 2nd aspect of the present invention, there is provided a communication system in which a first device and a second device are connected by a channel, and the first device and a second device establish communication via the channel, and in this communication system, the first device comprises a radio interface for establishing radio communication with a storage medium which includes a radio interface, and the second device comprises a control means for controlling reading of setting information from the storage medium via the radio interface by means of the first device or writing of setting information onto the storage medium, via the channel; and a setting means for carrying out setting of the second device on the basis of the setting information read from the storage medium. Therefore, when the second device establishes the communication with the first device via the channel, it is unnecessary for the user to carry out the setting of each device using a storage medium corresponding to each of the devices connected to the channel, like in the prior art, and the radio communication can be established with the storage medium by merely bringing the storage medium closer to the first device, to obtain the setting information stored in the storage medium, and the setting of the second device can be easily executed on the basis of the setting information, and further when plural second devices are connected to the channel, the setting of the plural second devices can be simultaneously executed, whereby the operationality of the user is increased.

According to a 3rd aspect of the present invention, in the communication system of the 1st or 2nd aspect, the second device establishes communication with the first device via the channel, with start-up of the communication system as a trigger, and the setting of the second device is carried out on the basis of the setting information read from the storage medium. Therefore, the setting of the second device can be carried out automatically at each start-up of the communication system.

According to a 4th aspect of the present invention, in the communication system of the 1st aspect, the second device establishes communication with the first device via the channel, with insertion of the storage medium into the storage medium interface as a trigger, and the setting of the second device is carried out on the basis of the setting information read from the storage medium. Therefore, the setting of the second device can be carried out automatically each time when the storage medium is inserted into the first device.

According to a 5th aspect of the present invention, in the communication system of the 2nd aspect, the second device establishes communication with the first device via the channel, with a fact that the first device and the storage medium become communicable by radio via the radio interface as a trigger, and the setting of the second device is carried out on the basis of the setting information read from the storage medium. Therefore, the setting of the second device can be carried out automatically by merely getting the storage medium closer to an area in which the radio communication with the first device becomes possible.

According to a 6th aspect of the present invention, in the communication system of the 2nd aspect, the second device establishes communication with the first device via the channel, with a fact that the first device and the storage medium become communicable by radio via the radio interface as a trigger, and the setting of the second device is carried out on the basis of the setting information read from the storage medium, and the setting of the second device is released with a fact that the first device and the storage medium become incommunicable by radio via the radio interface as a trigger. Therefore, the setting operation for the second device can be easily controlled with the fact that the radio communication between the first device and the storage medium becomes possible or impossible as a trigger.

According to a 7th aspect of the present invention, in the communication system of the 1st or 2nd aspect, the second device establishes communication with the first device via the channel, with receipt of a message from a third device connected to the channel, for requesting update of setting information as a trigger, and the setting of the second device is carried out on the basis of the setting information read from the storage medium. Therefore, when the second device receives the message for requesting the update of the setting information from the third device, the setting of the second device can be automatically carried out.

According to an 8th aspect of the present invention, in the communication system of the 1st or 2nd aspect, when the setting information read from the storage medium is updated, the second device writes the updated setting information in the storage medium via the channel. Therefore, when the setting information of the self-device is updated, the second device can automatically write the updated setting information on the storage medium.

According to a 9th aspect of the present invention, in the communication system of the 1st or 2nd aspect, the setting information stored in the storage medium includes setting information for each person or identification information for identifying a person. Therefore, the second device can be easily set in the setting environment which is suitable for each person, only by exchanging the storage medium to be inserted into the first device.

According to a 10th aspect of the present invention, in the communication system of the 1st or 2nd aspect, the setting information stored in the storage medium includes user interface setting information concerning setting of a user interface of a Human Machine Interface device, and when the second device is a Human Machine Interface device, it establishes communication with the first device via the channel, and the setting of the second device is carried out on the basis of the user interface setting information which is included in the setting information read from the storage medium. Therefore, the second device can be easily set in the user interface environment which is suitable for each user, by merely exchanging the storage medium to be inserted into the first device.

According to an 11th aspect of the present invention, in the communication system of the 1st or 2nd aspect, the setting information stored in the storage medium includes voice recognition information concerning voice recognition for each person stored in a voice recognition device, and when the second device is a voice recognition device, it establishes communication with the first device via the channel, and the setting of the second device is carried out on the basis of the voice recognition information which is included in the setting information read from the storage medium. Therefore, the second device can be easily set in the voice recognition environment which is suitable for each user, by merely exchanging the storage medium to be inserted into the first device.

According to a 12th aspect of the present invention, in the communication system of the 1st or 2nd aspect, the setting information stored in the storage medium includes executable program information, and the second device establishes communication with the first device via the channel, and executes a program on the basis of the program information which is included in the setting information read from the storage medium. Therefore, the communication system which can execute a more complicated setting operation can be realized by changing the setting information stored in the storage medium from just data to a program.

According to a 13th aspect of the present invention, the communication system of the 1st or 2nd aspect comprises a relay device which is connected to a first channel constituted by the channel and a second channel different from the first channel, and this relay device comprises plural communication means for establishing communications with the first channel and the second channel, respectively, and a control means for controlling relay between the first channel and the second channel. Therefore, the communication between the first channel and the second channel can be easily relayed via the relay device.

According to a 14th aspect of the present invention, in the communication system of the 1st or 2nd aspect, the first device is connected to a first channel constituted by the channel and a second channel different from the first channel, and performs relay between the first channel and the second channel. Therefore, the communication between the first channel and the second channel can be easily relayed by using the first device as the relay device.

According to a 15th aspect of the present invention, in the communication system of the 1st or 2nd aspect, the storage medium is a memory card. Therefore, the second device can be set by merely inserting the memory card into the first device.

According to a 16th aspect of the present invention, in the communication system of the 1st or 2nd aspect, the storage medium is a PCMCIA card. Therefore, the second device can be set by merely inserting the PCMCIA card into the first device.

According to a 17th aspect of the present invention, in the communication system of the 1st or 2nd aspect, the storage medium is an IC card. Therefore, the second device can be set by merely inserting the IC card into the first device.

According to an 18th aspect of the present invention, there is provided a vehicle-mounted communication system which is obtained by using the communication system of the 1st or 2nd aspect to be mounted on a vehicle, and in this vehicle-mounted communication system, the second device establishes communication with the first device via the channel, with turning-on of an ignition key or start-up of an engine of the vehicle as a trigger, and the setting of the second device is carried out on the basis of the setting information read from the storage medium. Therefore, the setting of the second device can be carried out automatically, with the turning-on of the ignition key or start of the engine of the vehicle as a trigger.

According to a 19th aspect of the present invention, there is provided a vehicle-mounted communication system which is obtained by using the communication system of the 1st or 2nd aspect to be mounted on a vehicle, and in this vehicle-mounted communication system, the first device or the second device analyzes contents of vehicle speed information transmitted from a vehicle speed sensor, and when recognizing that the vehicle speed is higher than a prescribed speed, controls the setting of the second device not to be carried out. Therefore, when the setting is updated at a time when the vehicle speed is higher than the prescribed speed, the setting operation for the second device is controlled, thereby preventing harmful effects on the safe running of the vehicle.

According to a 20th aspect of the present invention, there is provided a vehicle-mounted communication system which is obtained by using the communication system of the 1st or 2nd aspect to be mounted on a vehicle, and in this vehicle-mounted communication system, the first device or the second device analyzes contents of status information indicating an engine operation status transmitted from an engine sensor, and when recognizing that the engine is working, controls the setting of the second device not to be carried out. Therefore, when the setting is updated while the engine is working, the setting operation for the second device is controlled, thereby preventing harmful effects on the safe running of the vehicle.

According to a 21st aspect of the present invention, there is provided a vehicle-mounted communication system which is obtained by using the communication system of the 1st or 2nd aspect to be mounted on a vehicle, and in this vehicle-mounted communication system, the setting information stored in the storage medium includes seat position setting information concerning a seat position for each person, and when the second device is a device for setting the seat position of the vehicle, it establishes communication with the first device via the channel, and the setting of the second device is carried out on the basis of the seat position setting information which is included in the setting information read from the storage medium. Therefore, the seat position can be adjusted automatically to a position which is suitable for each user.

According to a 22nd aspect of the present invention, there is provided a vehicle-mounted communication system which is obtained by using the communication system of the 1st or 2nd aspect to be mounted on a vehicle, and in this vehicle-mounted communication system, the setting information stored in the storage medium includes mirror position setting information concerning a mirror position of the vehicle for each person, and when the second device is a device for setting the mirror position of the vehicle, it establishes communication with the first device via the channel, and the setting of the second device is carried out on the basis of the mirror position setting information which is included in the setting information read from the storage medium. Therefore, the mirror position of the vehicle can be automatically adjusted to a position which is suitable for each user.

According to a 23rd aspect of the present invention, there is provided a vehicle-mounted communication system which is obtained by using the communication system of the 1st or 2nd aspect to be mounted on a vehicle, and in this vehicle-mounted communication system, the setting information stored in the storage means includes handle position setting information concerning a handle position of the vehicle for each person, and when the second device is a device for setting a handle position of the vehicle, it establishes communication with the first device via the channel, and the setting of the second device is carried out on the basis of the handle position setting information which is included in the setting information read from the storage medium. Therefore, the handle position of the vehicle can be automatically set in a position which is suitable for each user.

According to a 24th aspect of the present invention, there is provided a vehicle-mounted communication system which is obtained by using the communication system of the 1st or 2nd aspect to be mounted on a vehicle, and in this vehicle-mounted communication system, the setting information stored in the storage medium includes air conditioner setting information concerning an air conditioner environment for each person, and when the second device is an air conditioner device, it establishes communication with the first device via the channel, and the setting of the second device is carried out on the basis of the air conditioner setting information which is included in the setting information read from the storage medium. Therefore, the air conditioner can be automatically set in an environment which is suitable for each user.

According to a 25th aspect of the present invention, there is provided a vehicle-mounted communication system which is obtained by using the communication system of the 1st or 2nd aspect to be mounted on a vehicle, the setting information stored in the storage medium includes car audio setting information concerning a car audio environment for each person, and when the second device is a car audio device, it establishes communication with the first device via the channel, and the setting of the second device is carried out on the basis of the car audio setting information which is included in the setting information read from the storage medium. Therefore, the car audio device can be automatically set in an environment which is suitable for each user.

According to a 26th aspect of the present invention, there is provided a vehicle-mounted communication system which is obtained by using the communication system of the 1st or 2nd aspect to be mounted on a vehicle, the setting information stored in the storage medium includes car navigator setting information concerning a car navigator environment for each person, and when the second device is a car navigator device, it establishes communication with the first device via the channel, and the setting of the second device is carried out on the basis of the car navigator setting information which is included in the setting information read from the storage medium. Therefore, the car navigator can be automatically set in an environment which is suitable for each user.

According to a 27th aspect of the present invention, a communication device as a first device which establishes communication with a second device via a channel comprises: a storage medium interface to and from which a storage medium can be inserted or removed; a communication means for establishing the communication with the second device via the channel; and a control means for controlling reading of setting information from the storage medium which has been inserted into the storage medium interface, or writing of setting information of the second device which has been received from the second device via the channel onto the storage medium. Therefore, when the second device establishes the communication with the first device via the channel, it is unnecessary for the user to carry out the setting of each device using a storage medium corresponding to each of the devices connected to the channel, like in the prior art, the setting of the second device can be easily executed by merely inserting the storage medium into the first device, and further when plural second devices are connected to the channel, the setting of the plural second devices can be simultaneously executed, whereby the operationality of the user can be increased.

According to a 28th aspect of the present invention, a communication device as a first device which establishes communication with a second device via a channel comprises: a radio interface for establishing radio communication with a storage medium having a radio interface; a communication means for establishing the communication with the second device via the channel; and a control means for controlling reading of setting information from the storage medium or writing of setting information of the second device which has been received from the second device via the channel onto the storage medium, via the radio interface. Therefore, when the second device establishes the communication with the first device via the channel, it is unnecessary for the user to carry out the setting of each device using a storage medium corresponding to each of the devices connected to the channel, like in the prior art, the radio communication with the storage medium is established by merely bringing the storage medium closer to the first device, to obtain the setting information stored in the storage medium, and the setting of the second device can be easily executed on the basis of the setting information, and further when plural second devices are connected to the channel, the setting of the plural second devices can be simultaneously executed, whereby the operationality of the user is increased.

According to a 29th aspect of the present invention, in the communication device of the 27th aspect, the control means reads the setting information from the storage medium which has been inserted into the storage medium interface to transmit the same to the second device, with receipt of a message for requesting the setting information from the second device as a trigger. Therefore, the setting operation for the second device can be started, with the receipt of the message for requesting the setting information from the second device as a trigger.

According to a 30th aspect of the present invention, in the communication device of the 27th aspect, the control means reads access address information to the storage medium which has been inserted into the storage medium interface to transmit the same to the second device, with start-up of the communication device as a trigger. Therefore, even when the second device does not have the access address information for the storage means, the second device can acquire the setting information in accordance with the access address information received from the communication device, and perform the setting operation.

According to a 31st aspect of the present invention, in the communication device of the 27th aspect, the control means reads the setting information from the storage medium which has been inserted into the storage medium interface to transmit the same to the second device, with start-up of the communication device as a trigger. Therefore, even when the second device does not have the access address information for the storage means, it can receive the setting information from the communication device and perform the setting operation.

According to a 32nd aspect of the present invention, in the communication device of the 27th aspect, the control means transmits a message indicating that the storage medium has been inserted into the storage medium interface, to the second device, with the insertion of the storage medium into the storage medium interface as a trigger. Therefore, the setting operation for the second device can be started up automatically with the insertion of the storage medium into the communication device as a trigger.

According to a 33rd aspect of the present invention, in the communication device of the 27th aspect, the control means reads the setting information from the storage medium which has been inserted into the storage medium interface to transmit the same to the second device, with the insertion of the storage medium into the storage medium interface as a trigger. Therefore, the setting operation for the second device can be started up automatically with the insertion of the storage medium into the communication device as a trigger.

According to a 34th aspect of the present invention, in the communication device of the 28th aspect, the control means transmits a message indicating that the storage medium has been found, to the second device, with a fact that radio communication becomes possible via the storage medium and the radio interface as a trigger. Therefore, the setting operation for the second device can be started up automatically with the fact that the radio communication with the storage medium becomes possible as a trigger.

According to a 35th aspect of the present invention, in the communication device of the 28, the control means reads the setting information from the storage medium via the radio interface to transmit the same to the second device, with a fact that radio communication becomes possible via the storage medium and the radio interface as a trigger. Therefore, the setting operation for the second device can be started up automatically with the fact that the radio communication with the storage medium becomes possible as a trigger.

According to a 36th aspect of the present invention, there is provided a vehicle-mounted device which is obtained by using the communication device of the 27th or 28th to be mounted on a vehicle. Therefore, the vehicle-mounted device which can easily carry out the setting of the second device by merely exchanging the storage medium inserted into the communication device or storage medium for establishing the radio communication can be realized.

According to a 37th aspect of the present invention, in the vehicle-mounted device of the 36th aspect, when vehicle speed information is received from a vehicle speed sensor by the communication means, the control means analyzes contents of the vehicle speed information and when recognizing that the vehicle speed is higher than a prescribed speed, controls the setting information read from the storage medium which has been inserted into the storage medium interface so as not to be transmitted to the second device. Therefore, when the setting is updated at a time when the vehicle speed is higher than the prescribed speed, the setting operation for the second device is controlled, thereby preventing harmful effects on the safe running of the vehicle.

According to a 38th aspect of the present invention, in the vehicle-mounted device of the 36th aspect, when status information indicating an engine operation status is received from an engine sensor by the communication means, the control means analyzes contents of the status information and when recognizing that the engine is working, controls the setting information read from the storage medium which has been inserted into the storage medium interface so as not to be transmitted to the second device. Therefore, when the setting is updated while the engine is working, the setting operation for the second device is controlled, thereby preventing harmful effects on the safe running of the vehicle.

According to a 39th aspect of the present invention, a communication device as a second device for establishing communication with a first device via a channel comprises: a communication means for establishing the communication with the first device via the channel; a control means for controlling reading of setting information from the first device or writing of setting information onto the first device, via the channel; and a setting means for carrying out setting of the second device on the basis of the setting information which is read from the first device and received by the communication means, and in this communication device, when the setting information read from the first device is updated, the control means controls writing of the updated setting information onto the first device. Therefore, the setting of the second device can be easily carried out on the basis of the setting information received via the channel, and further when the received setting information has been changed, the changed setting information can be stored automatically in the storage medium, whereby the operationality of the user is increased.

According to a 40th aspect of the present invention, in the communication device of the 39the aspect, the control means creates a message for requesting the setting information to transmit the same to the first device, with start-up of the communication device as a trigger. Therefore, when the communication device is started up, the setting operation can be started automatically.

According to a 41st aspect of the present invention, in the communication device of the 39th aspect, the control means creates a message for requesting access address information required for the communication with the first device to transmit the same by broadcast, with start-up of the communication device as a trigger, and when the communication means receives the access address information from the first device, it transmits a message for requesting setting information on the basis of the access address information. Therefore, even when the access address information is not included, the setting information can be received via the channel, with the start-up of the communication device as a trigger.

According to a 42nd aspect of the present invention, in the communication device of the 39th aspect, the communication means transmits a message for requesting setting information, with receipt of a message for requesting setting information from a third device which is connected to the channel as a trigger. Therefore, with the receipt of the message for requesting the setting information from the third device which is connected to the channel as a trigger, the setting operation of the self-device can be easily started automatically.

According to a 43rd aspect of the present invention, the communication device of the 39th aspect further comprises a default setting storage means for containing default setting information of the second device, and in this communication device, when the setting means receives setting information from the first device, it carries out the setting of the second device on the basis of the setting information, and when it receives no setting information from the first device, it carries out the setting of the second device on the basis of the default setting information. Therefore, even when the setting information cannot be received via the channel, the setting of the self-device can be carried out in accordance with the default setting information.

According to a 44th aspect of the present invention, there is provided a vehicle-mounted device which is obtained by using the communication device of the 39th aspect to be mounted on a vehicle. Therefore, the vehicle-mounted device which can easily execute and change the setting of the self-device on the basis of the setting information received via the channel can be provided.

According to a 45th aspect of the present invention, in the vehicle-mounted device of the 44th aspect, when vehicle speed information is received from a vehicle speed sensor by the communication means, the control means analyzes contents of the vehicle speed information and when recognizing that the vehicle speed is higher than a prescribed speed, controls the setting means so as not to execute the setting of the second device. Therefore, when the setting is updated as a time when the vehicle-speed is higher than the prescribed speed, the setting operation of the second device is controlled, thereby preventing harmful effects on the safe running of the vehicle.

According to a 46th aspect of the present invention, in the vehicle-mounted device of the 44th aspect, when status information indicating an engine operation status is received from an engine sensor by the communication means, the control means analyzes contents of the status information and when recognizing that the engine is working, controls the setting means so as not to execute the setting of the second device. Therefore, when the setting is updated while the engine is working, the setting operation for the second device is controlled, thereby preventing harmful effects on the safe running of the vehicle.

BRIEF DESCRIPTION OF THE DRAWINGS

FIG. 2 is a diagram showing an example of access address information.

FIG. 3 is a diagram showing another example of the access address information.

DETAILED DESCRIPTION OF THE PREFERRED EMBODIMENTS

Hereinafter, embodiments of the present invention will be described with reference to the drawings. The embodiments shown here are only examples, and the present invention is not limited to these embodiments.

Embodiment 1

Hereinafter, a communication system according to the first embodiment is described.

Figure 1:
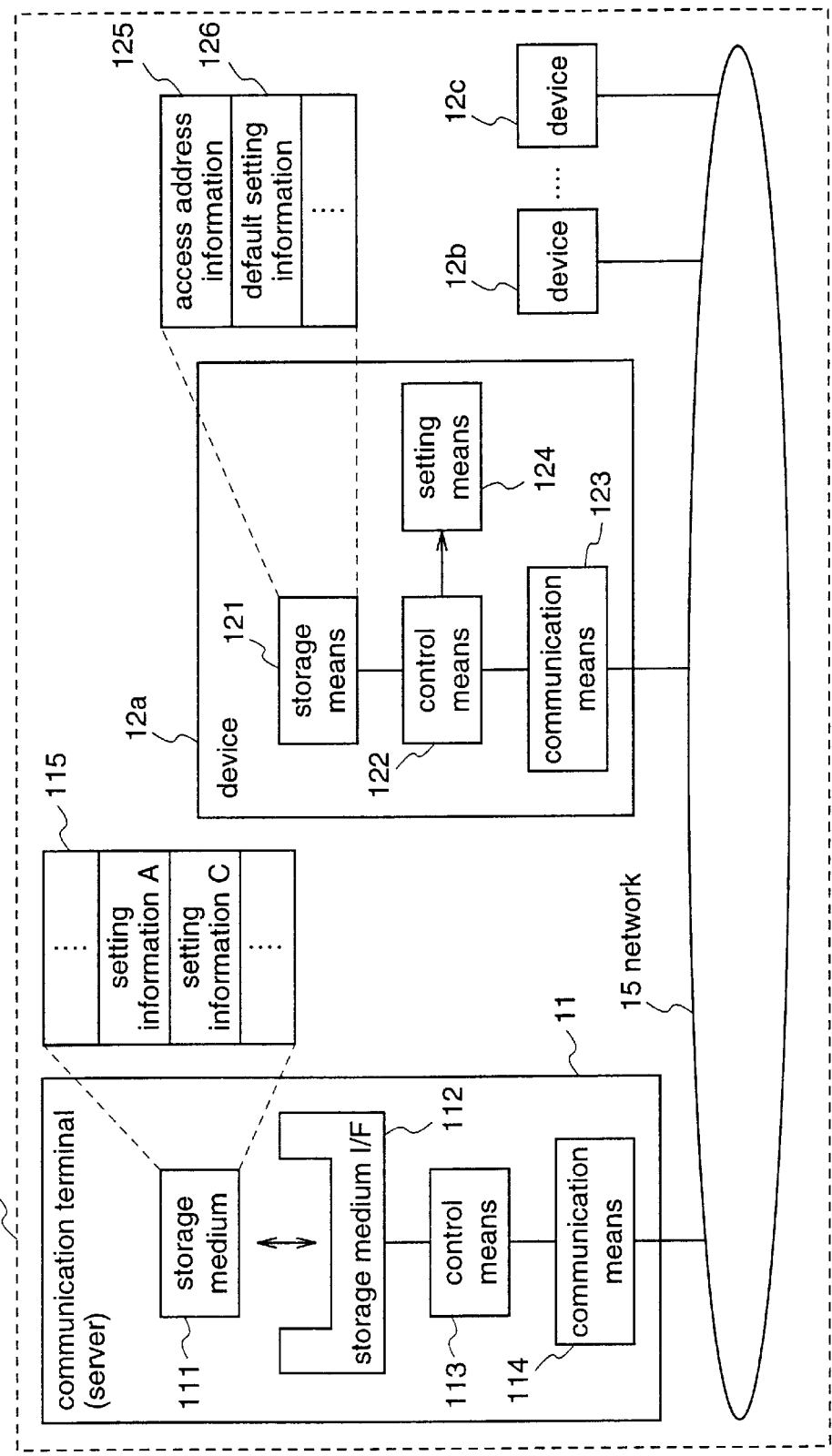
FIG. 1 is a diagram illustrating a communication system according to a first embodiment of the present invention.

FIG. 1 is a diagram illustrating a communication system 101 of the first embodiment.

In FIG. 1, reference numeral 15 denotes a network, numeral 11 denotes a communication terminal (server), and numerals 12a, 12b and 12c denote devices. The communication terminal (server) 11, and the devices 12a, 12b and 12c are connected by the network 15, respectively. Here, each of the devices 12a, 12 b and 12c is realized by a vehicle-mounted device such as a CD changer, a DVD-drive, and a car navigator, or a HMI (Human Machine Interface) unit such as a touch panel and a control panel, or the like. Or, the device can also be realized by a control unit for each element in a vehicle, such as a seat position control unit and a mirror position control unit. Further, when the communication system 101 is a communication system to be mounted on a vehicle, the communication terminal (server) 11 can be realized by an integrated operation panel of the car navigator and devices in the vehicle, and the like.

The communication terminal (server) 11 comprises a storage medium I/F (interface) 112 to/from which a storage medium 111 can be attached/removed, a control means 113, and a communication means 114.

The storage medium 111 is removable from the communication terminal (server) 11 and contains device setting information 115. Here, the storage medium 111 is realized by an SD memory card, a memory stick of the like. It can also be realized by a PCMCIA card, a compact flash, a flash memory, an IC card or the like. In this case, the storage medium I/F 112 corresponding to the storage medium 111 is provided, for example a PCMCIA card slot is provided in the case of the PCMCIA card, and an IC card reader is provider in the case of the IC card.

The control means 113 controls each module in the communication terminal (server) 11, comprises a CPU (Central Processing Unit), a ROM (Read Only Memory), a RAM (Random Access Memory) and the like, and can be constructed so as to execute the control of each module by executing a program on the ROM with utilizing the RAM as a storage area in the program execution.

The communication means 114 provides a means for the communication terminal (server) 11 to communicate with other devices by means of the network 15, and includes a protocol controller chip, a transmission means and a receiving means of the network 15.

The device 12a comprises a storage means 121, a control means 122, a communication means 123 and a setting means 124, and the storage means 121 contains access address information 125 and default setting information 126.

The access address information 125 is information required by the device 12a to access the storage medium 111 of the communication terminal (server) 11, and is composed of, for example, information such as the address of the communication terminal (server) 11 on the network 15, an offset address in the device, an ID or name (file name, retrieval key of a database or the like) of information to be read.

Specific structures of the access address information 125 are shown in FIGS. 2 and 3.

FIG. 2 shows an address designation example in a case where a data stored in the storage means 121 has a structure of a file system such as a FAT (File Allocation Table), and includes a directory name and a file name, indicating the address of the communication terminal (server) 11 and the location of target data. When the access address information is composed as described above, other devices on the network can access the storage medium 111 of the communication terminal (server) 11 as a file.

FIG. 3 is an address designation example in a case where the data stored in the storage means 121 is a database in a form of table, which includes the address of the communication terminal (server) 11 and the retrieval key for the target data and the like.

The default setting information 126 is setting information for a default of the device 12a, and is a data to be utilized in cases where data to be acquired from the access address information 125 are not available and the like.

Figure 8:
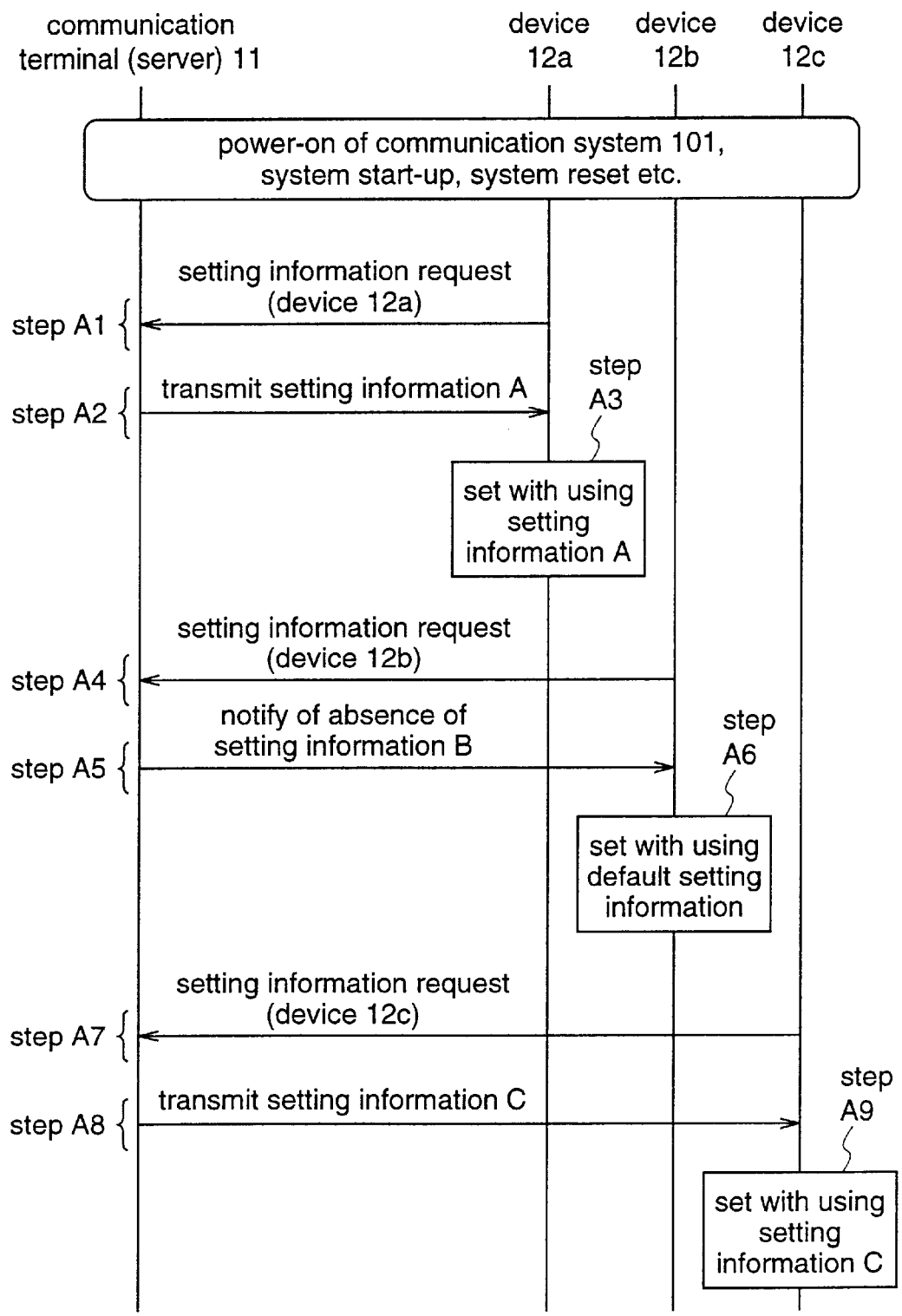
FIG. 8 is a diagram showing a schematic sequence of a processing according to the first embodiment.

The operation of the so-constructed communication system 101 is described with reference to FIG. 8.

Initially, in the communication system 101, when the power-on of the system, system start-up, system reset or the like occurs, the device 12a reads the access address information 125 stored in the storage means 121 using the control means 122 to create a setting information request, and transmits the request to the communication terminal (server) 11 via the network 15 using the communication means 123 (step A1).

Figure 4:
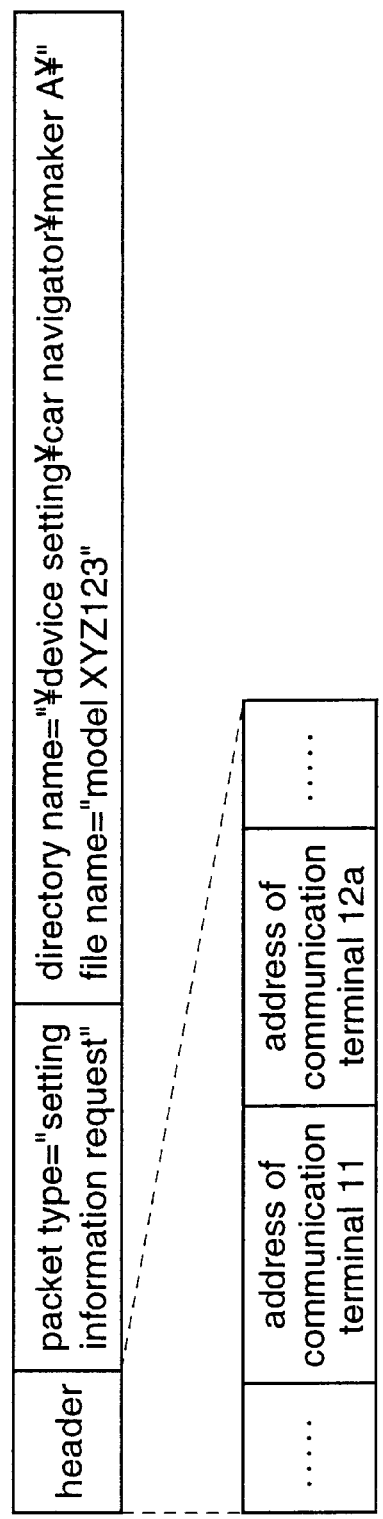
FIG. 4 is a diagram showing an example of a setting information request.
Figure 5:
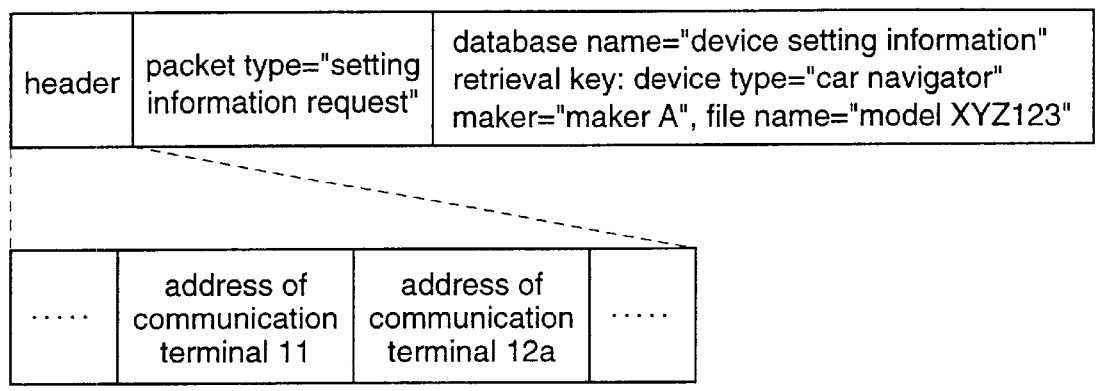
FIG. 5 is a diagram showing another example of the setting information request.

Here, the setting information request reading of the setting information concerning the self-device (the device 12a in this case), stored in the storage medium 111 in the communication terminal (server) 11, and examples of the setting information request are shown in FIGS. 4 and 5. The setting information request shown in FIG. 4 includes the address of the target communication terminal (server) 11, the address of the self-device, data for specifying necessary data (a directory name and a file name) and the like. The setting information request shown in FIG. 5 includes a database name and a retrieval key of the database as the data for specifying necessary data.

Then, the communication terminal (server) 11 receives the setting information request using the communication means 114, analyses the contents of the setting information request using the control means 113 to control the storage medium I/F 112, retrieves target setting information A from the device setting information 115 stored in the storage medium 111, and transmits the information to the device 12a via the network 15 (step A2).

Figure 6:
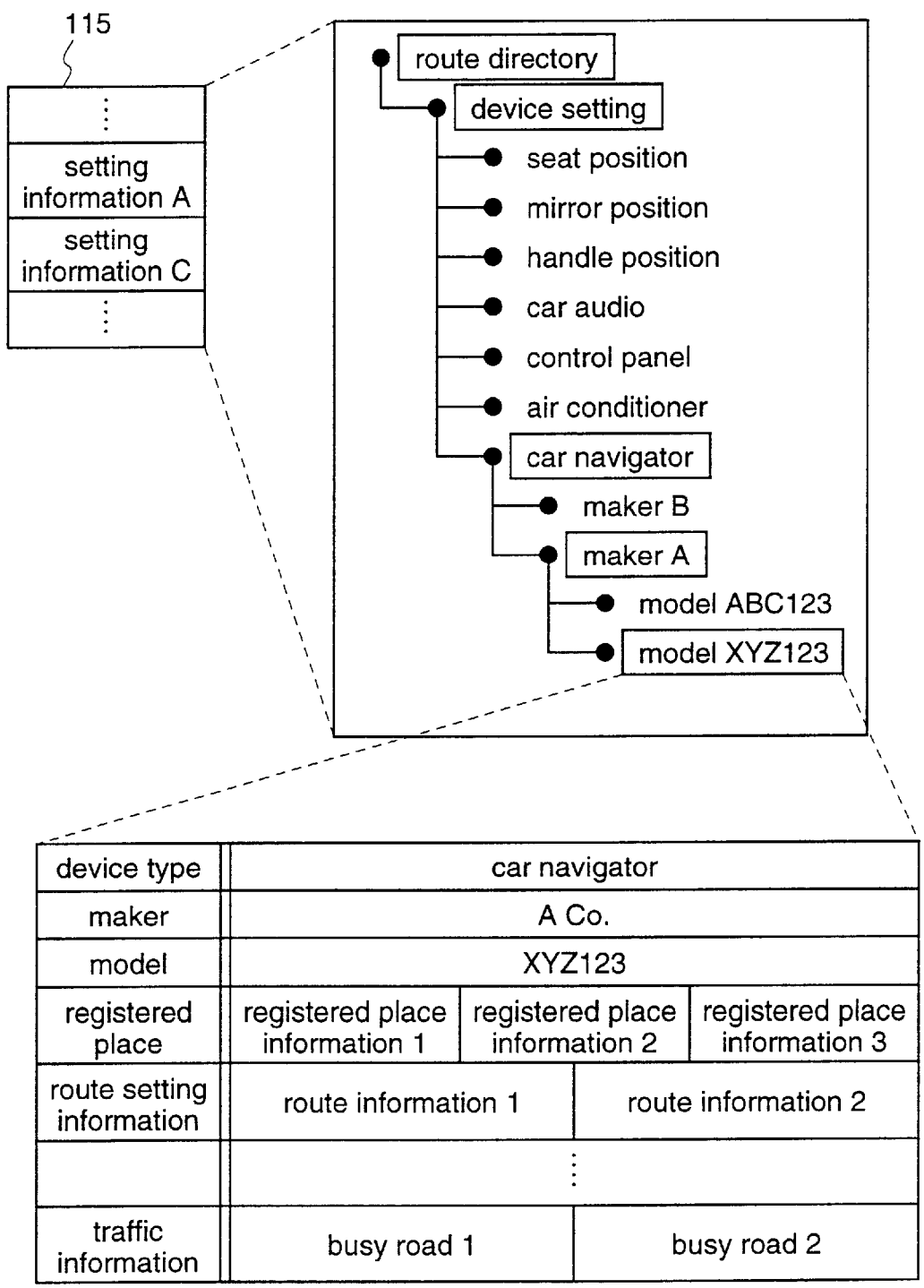
FIG. 6 is a diagram showing an example of device setting information.

Here, for example when the device setting information 115 is composed as shown in FIG. 6 and the setting information request is composed as shown in FIG. 4, the target file is retrieved on the basis of the directory name (¥device setting¥car navigator¥maker A¥) and the file name (model XYZ123) in the setting information request.

Figure 7:
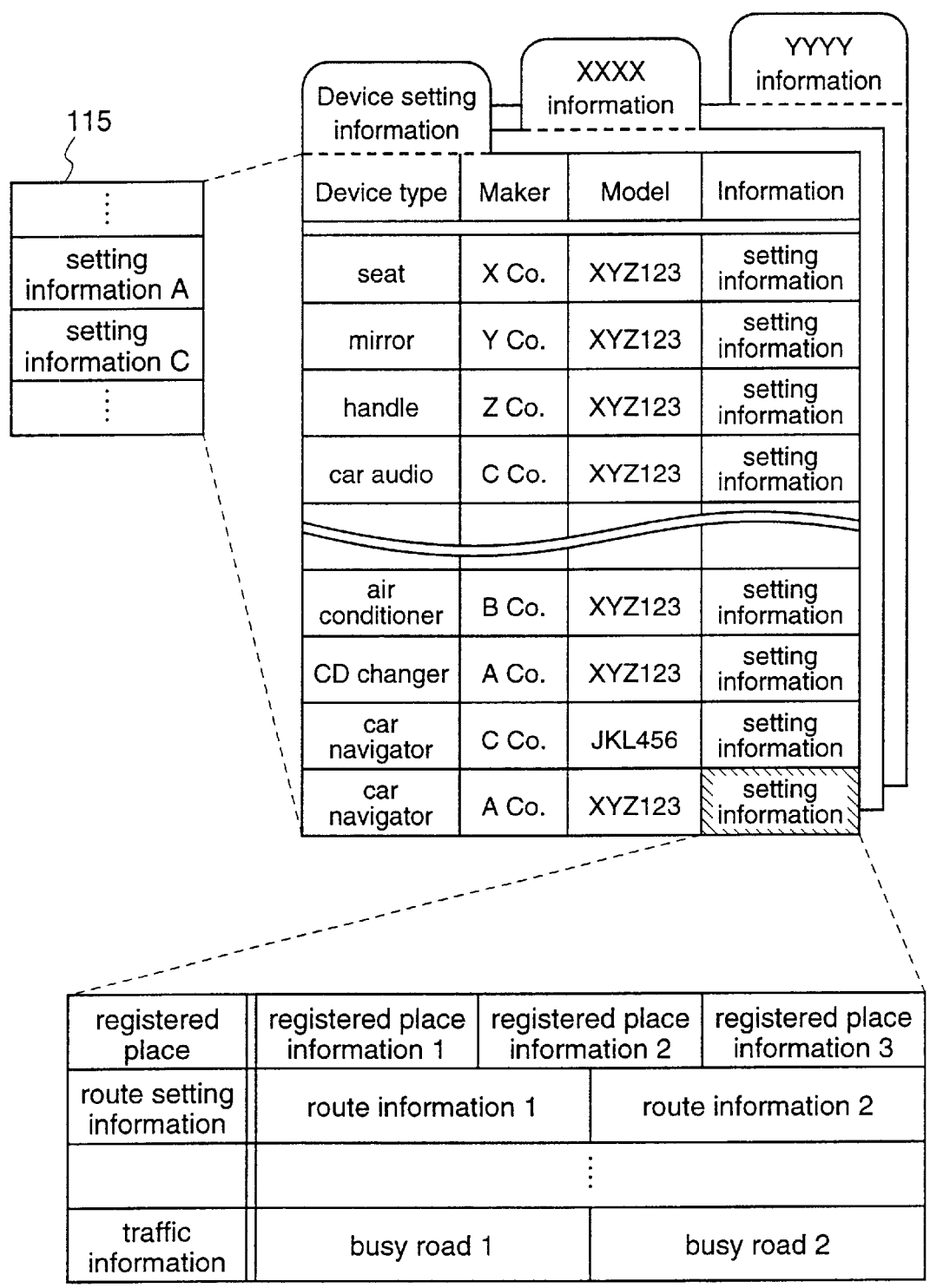
FIG. 7 is a diagram showing another example of the device setting information.

In addition, when the device setting information 115 is composed as shown in FIG. 7 (in FIG. 7, assume that "device setting information", "XXXX information", and "YYYY information" are database names, respectively), and the setting information request is composed as shown in FIG. 5, the target information is retrieved on the basis of the database name ("device setting information") and the retrieval key of the database ("device type="car navigator", maker="maker A", model="XYZ123") in the setting information request.

The device 12a receives the setting information A which has been retrieved as described above and transmitted by the communication terminal (server) 11, using the communication means 123. Then, the control means 122 transmits a control signal or setting information to the setting means 124 on the basis of the received setting information A, and the setting means 124 carries out the setting of the device 12a in a manner corresponding to the device 12a.

When the storage medium 111 is not inserted into the storage medium I/F 112 or necessary setting information is not stored in the storage medium 111, the device 12a cannot receive the setting information. Thus, it carries out a time-out processing after a prescribed time period and carries out the setting with utilizing the default setting information 126.

The setting of the device 12a is completed as described above. The devices 12b and 12c are set in the same way.

The device 12b transmits a setting information request to the communication terminal (server) 11 via the network 15 (step A4). Then, the communication terminal (server) 11 retrieves setting information B of the device 12b from the device setting information 115 stored in the storage medium 111. However, since the setting information B does not exist in the storage medium 111, the communication terminal (server) 11 notifies the device 12b of the absence of the setting information B via the network 15 (step A5). The device 12b which has received the notification of absence of the setting information B is set by using default information (step A6).

The device 12c transmits a setting information request to the communication terminal (server) 11 via the network 15 (step A7). Then, the communication terminal (server) 11 retrieves setting information C of the device 12c from the device setting information 115 stored in the storage medium 111, and transmits the setting information C to the device 12c via the network 15 (step A8). Then, the device 12c is set in accordance with the setting information C (step A9).

As described above, when the required setting information does not exist, the communication terminal (server) 11 notifies the device of the absence of the setting information, and the device carries out the setting on the basis of the default information, whereby the setting of the plural devices which are connected by the network 15 can be easily carried out.

Specific examples of the device 12a are shown below.

When the device 12a is a car audio device such as a CD changer, music order programming information, acoustical setting information (volume, sound quality, equalizer setting or the like) of a CD and the like can be used as the setting information A. The setting means 124 is constituted by a CPU for controlling the playback order of the CD in accordance with the music order programming information of the CD and memories such as a ROM and a RAM and the like. Or, the setting means 124 is constituted by an equalizer, an amplifier or the like, for adjusting sounds to be played in accordance with the acoustical setting information.

When the device 12a is a car navigator, route setting information, positional information of registered locations (destination, home and the like), differential information of updated map data and the like can be used as the setting information A. The setting means 124 is constituted by a memory for registering the route setting information and the positional information of the registered locations, and the like. Or, the setting means 124 is constituted by a mass storage means, such as a hard disk, a PD, and a DVD-RAM, for storing the differential information of the updated map data, and a drive thereof. Further, when the setting information A is data which are brought in from outside and used by the car navigator, such as traffic information, peripheral tourism information and peripheral map information, the setting means 124 is constituted by a CPU for interpreting the data which have been brought in from outside, a ROM and a RAM used by the CPU, a display for displaying the interpreted result, a controller for controlling the display and the like.

When the device 12a is an air conditioner device, operation setting such as cooling, heating and dehumidification, temperature setting, wind direction setting and the like can be used as the setting information A. The setting means 124 is constituted by a microcomputer for controlling various kinds of operations of the air conditioner, and a memory for storing the above-mentioned setting and the like.

Figure 9:
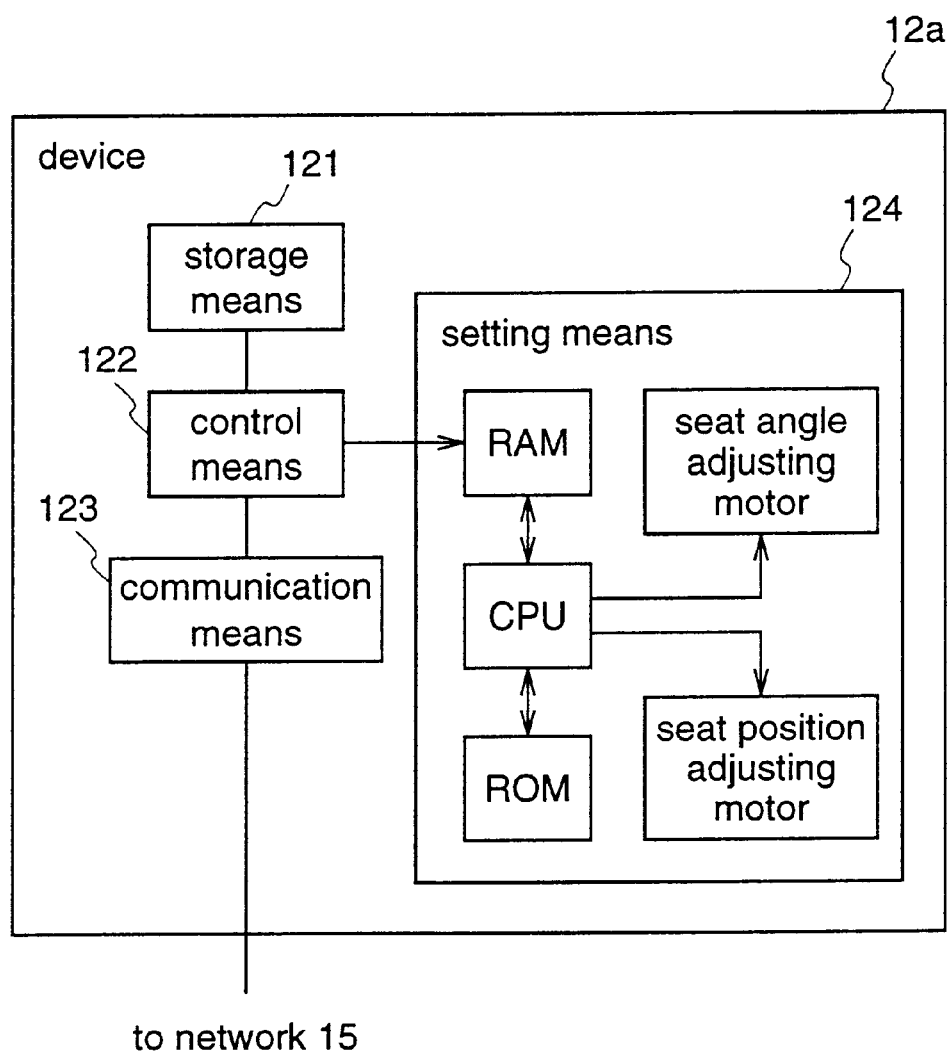
FIG. 9 is a diagram illustrating a structure of a device in a case where the device is a vehicle seat position control unit.

When the device 12a is a seat position control unit of a vehicle, seat position information such as the seat angle and fore-and-aft seat position can be used as the setting information A. As shown in FIG. 9, the setting means 124 is constituted by motors for adjusting the seat angle and the fore-and-aft seat position, a CPU for controlling the motors, and a ROM and a RAM used by the CPU and the like. The so-constructed device 12a reads the seat position information such as the seat angle and the fore-and-aft seat position as the setting information from the RAM using the CPU, controls the motors by executing a program stored in the ROM taking the read information as an input parameter, and sets the seat in a predetermined seat position.

When the device 12a is a mirror position control unit of a vehicle, information concerning an angle for setting a mirror and the like is used as the setting information A. The setting means 124 is constituted by a motor for adjusting the angle of the mirror, a CPU for controlling the motor, and a ROM and a RAM used by the CPU, and the like. The so-constructed device 12a reads the information concerning the mirror setting angle as the setting information from the RAM using the CPU, controls the motor by executing a program stored in the ROM taking the read information as an input parameter, and sets the mirror in a predetermined mirror position.

When the device 12a is a handle position control unit of a vehicle, information concerning a handle setting position and the like is used as the setting information A. The setting means 124 is constituted by a motor for adjusting the handle angle, a CPU for controlling the motor, and a ROM and a RAM used by the CPU, and the like. The so-constructed device 12a reads the handle angle information as the setting information from the RAM using the CPU, controls the motor by executing a program stored in the ROM taking the read information as an input parameter, and sets the handle in a predetermined handle position.

Further, when device setting information for each person is used as the device setting information 115 in the storage medium 111, the setting or configuration of plural vehicle-mounted devices and vehicle-mounted communication systems for each person can be easily realized.

Figure 10:
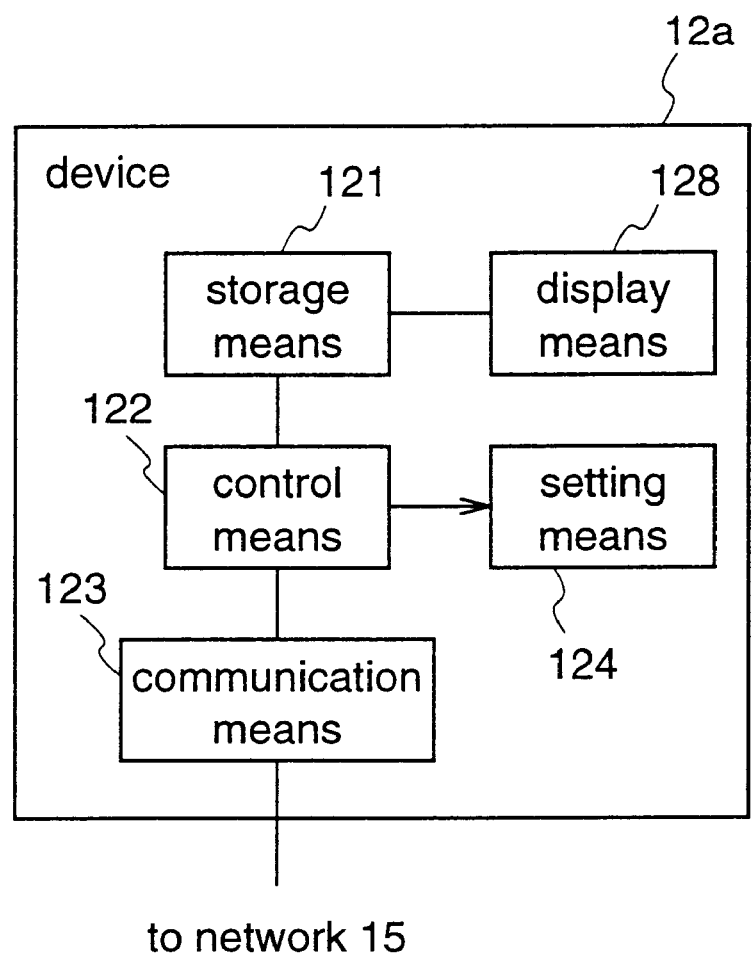
FIG. 10 is a diagram illustrating a structure of a device in a case where the device is an HMI.

For example, as shown in FIG. 10, when the device 12a is an HMI, the setting information includes information concerning the user interface. In FIG. 10, numeral 128 denotes a display means. When the display means 128 is realized by a control panel of the car navigator or the like, the HMI can be customized to suit each person.

More specifically, the applications such as creation of atmosphere in a vehicle to suit each person or according to moods or situations are possible when the information concerning the user interface is setting information as for an instrument panel, a car navigator screen, an audible alert to an improperly-locked door, and the color and sound of a car accessory, the size of the font on the operation screen of the car navigator, the color arrangement of the screen, the information of frequently used operation registered in function keys or the like In addition, when the information concerning the user interface is voice composed data, the applications such as the conversion of a car navigator guidance voice into a voice of a favorite personality or character are also possible.

Further, when the information concerning the user interface is dictionary data for a specified speaker in voice recognition in the car navigator or the like, the vehicle-mounted voice recognition system which can meet each person can be constructed only by changing the storage means such as a memory card, even when the user is different.

Figure 11:
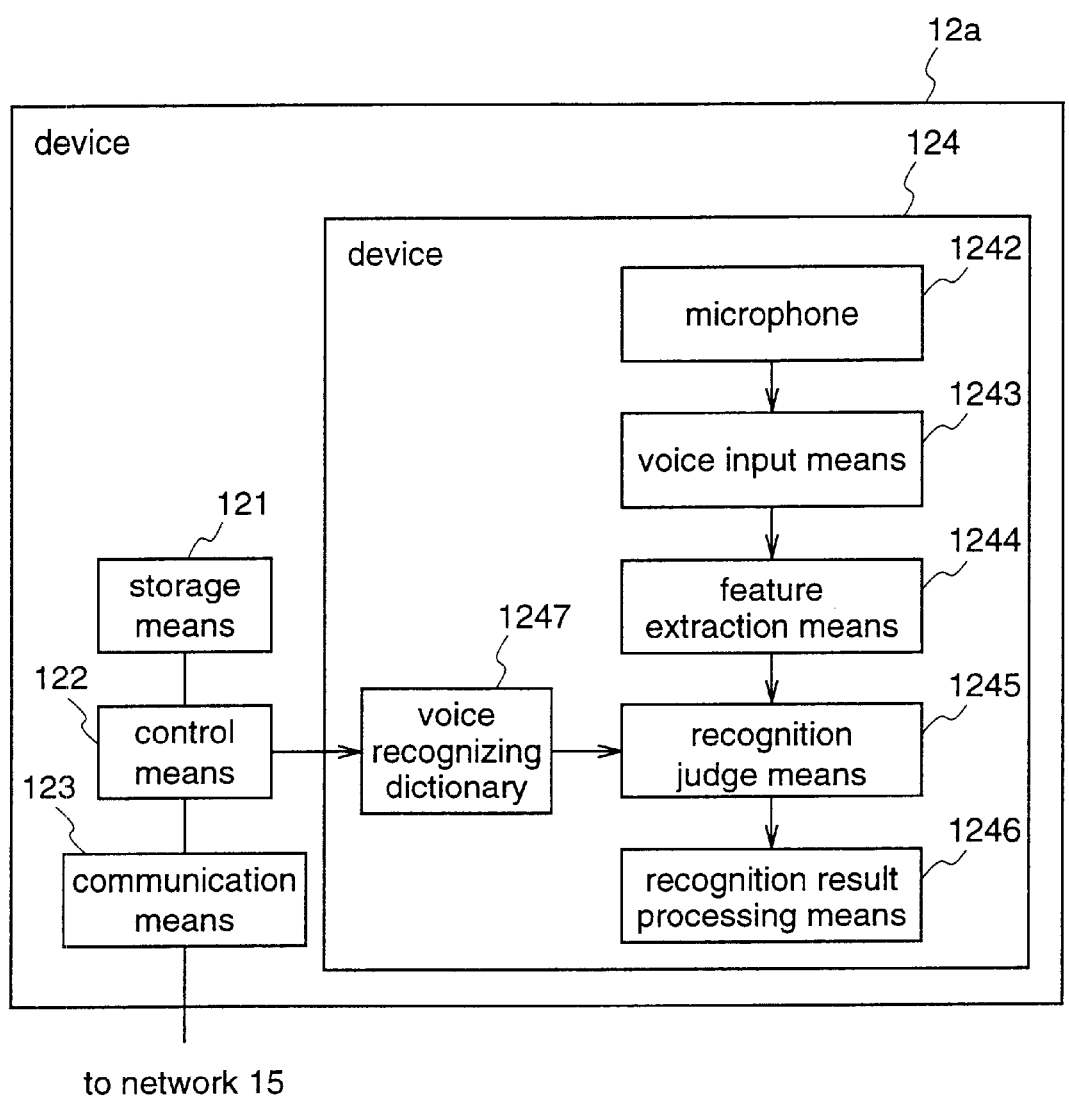
FIG. 11 is a diagram illustrating a structure of a device in a case where this is a device for carrying out voice recognition.

Here, an example where the device 12a is a device for performing voice recognition is described with reference to FIG. 11. In FIG. 11, the setting means 124 comprises a microphone 1242, a voice input means 1243, a feature extraction means 1244, a recognition judge means 1245, a recognition result processing means 1246, and a voice recognizing dictionary 1247. In this case, the voice recognizing dictionary 1247 has a dictionary for unspecified speaker and a dictionary for specified speaker. The dictionary for specified speaker is obtained by registering the setting information acquired by the communication means 123 (dictionary for specified speaker) in the voice recognizing dictionary 1247 by the control means 122. The so-constructed device 12a converts a voice signal which is input from the microphone 1242, into a digital signal using the voice input means 1243, and extracts a feature parameter from the output signal of the voice input means 1243 using the feature extraction means 1244. Then, the recognition judge means 1245 compares the feature parameter extracted by the feature extraction means 1244 with the standard pattern stored in the voice recognizing dictionary 1247, and recognizes the input voice. The recognition result processing means 1246 processes the recognition result in accordance with the contents of the voice recognized by the recognition judge means 1245. By doing so, the voice recognition system corresponding to a person can be constructed.

In the above-mentioned explanations, in the communication system 101, with the power-on of the system, the system start-up, the system reset or the like as a trigger, each of the devices which are connected to the communication terminal (server) 11 via the network 15 transmits the setting information request to the communication terminal (server) 11, and acquires the setting information from the communication terminal (server) 11. However, the procedure for acquiring the setting information of each device is not limited to that, and the communication terminal (server) 11 can transmit the setting information with the power-on of the communication system 101, the system start-up, the system reset or the like as a trigger. The transmission method at that time can be, for example, any of the broadcast method (addressed to all devices: setting information which is common to all devices and the like), multicast method (addressed to plural devices: setting information which is common to plural devices and the like), and unicast method (addressed to one device: setting information which is unique to one device and the like). In this case, it is desirable that the communication terminal (server) 11 should transmit the device setting information 115 only in a case where the storage medium 111 has been inserted into the storage medium I/F 112.

Figure 12:
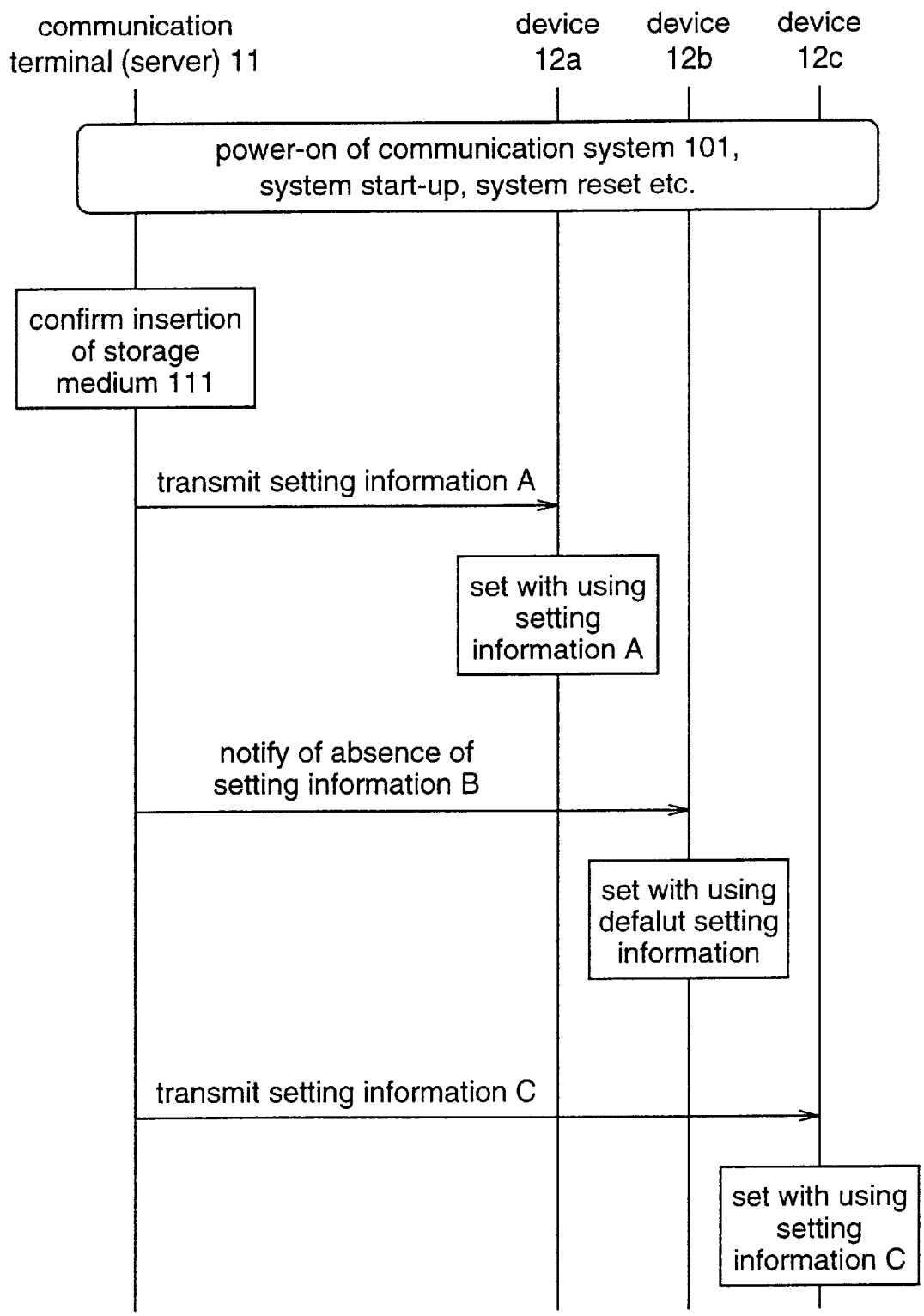
FIG. 12 is a diagram showing a schematic sequence of a processing in a case where all information is transmitted by unicast in the first embodiment.

The schematic flow in a case where all information is transmitted by unicast is shown in FIG. 12. In the communication system 101 shown in FIG. 12, with the power-on of the system, the system start-up, the system reset or the like as a trigger, the communication terminal (server) 11 detects whether the storage medium 111 is inserted into the storage medium I/F 112 or not. When confirming that the storage medium 111 is inserted, the communication terminal (server) 11 transmits the setting information A to the device 12a, notifies the device 12b of the absence of the setting information B, and transmits the setting information C to the device 12c. Then, the devices 12a and 12c are set using the setting information A and C, respectively, and the device 12b is set using the default setting information.

Figure 13:
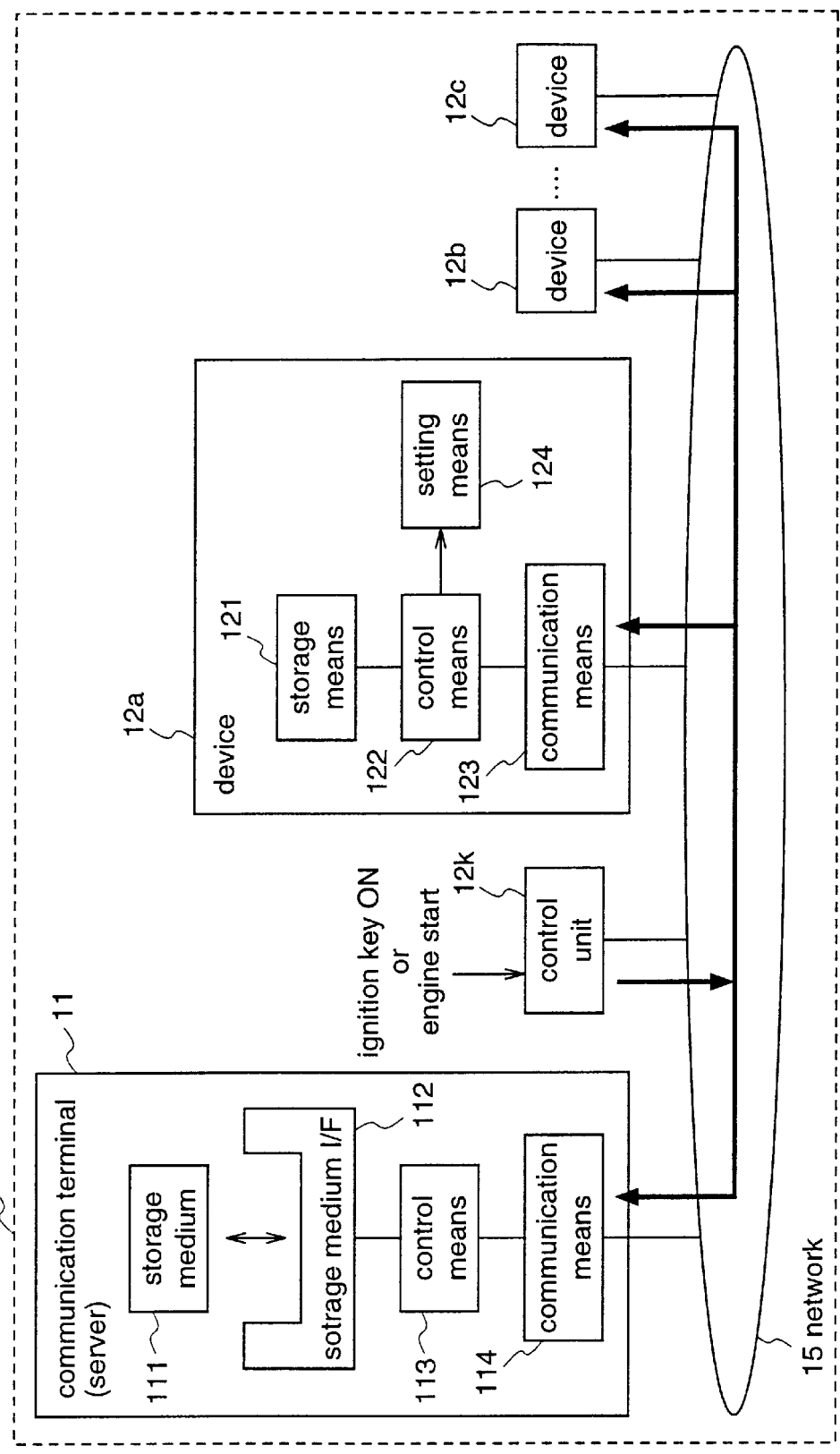
FIG. 13 is a diagram illustrating a structure of a system in a case where the system is constructed so that setting for a connected device is reflected by turning-on of an ignition key or engine starting.

When the communication system 101 is a vehicle-mounted system, it can be constructed so as to carry out the setting of the respective devices which are connected to the network 15, by turning-on of the ignition key or starting of the engine, as shown in FIG. 13. In FIG. 13, numeral 12k denotes a control unit, which transmits a message for instructing to carry out the setting of the respective devices connected to the network 15 upon the receipt of a control signal from the ignition switch unit or engine sensor or the like. In FIG. 13, the same reference numerals as those in FIG. 1 denote the same or corresponding elements.

In the so-constructed communication system 101, with the turning-on of the ignition key or starting of the engine as a trigger, the control unit 12k transmits the message for instructing to carry out the setting of the devices to the network 15 by broadcast. Or, the communication system 101 can be constructed so as to be started up by turning on the ignition key or starting the engine.

Figure 14:
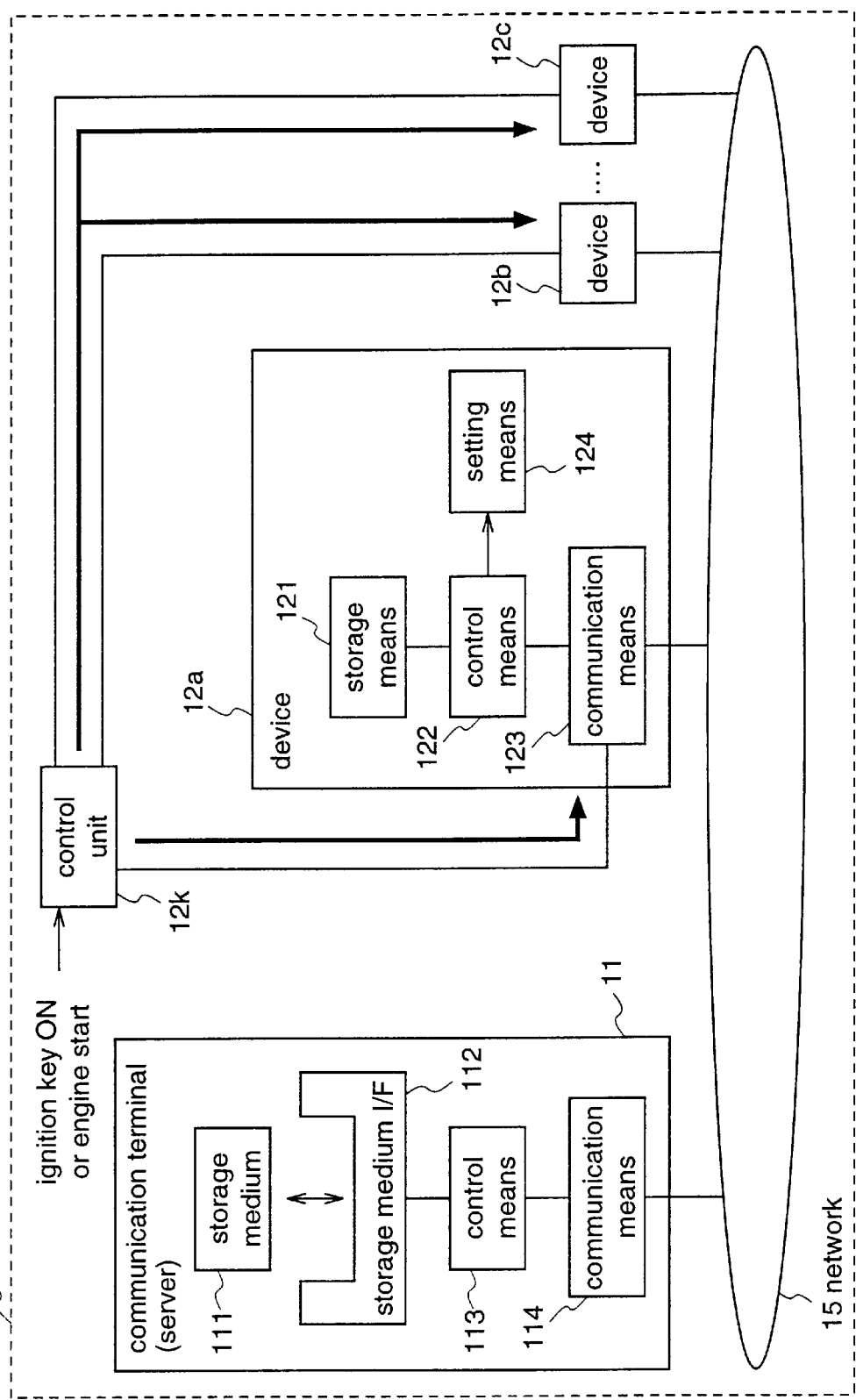
FIG. 14 is a diagram illustrating a structure of a system in a case where the system is constructed so that setting for a connected device is reflected by turning-on of an ignition key or engine starting.

In addition, as shown in FIG. 14, the control unit 12k as the ignition switch unit or engine sensor can be connected directly to the plural devices which are connected to the network 15.

By doing so, even when the control unit 12k is not connected to the network 15, the setting of the respective devices which are connected to the network 15 can be carried out by turning on the ignition key or starting the engine.

Figure 15:
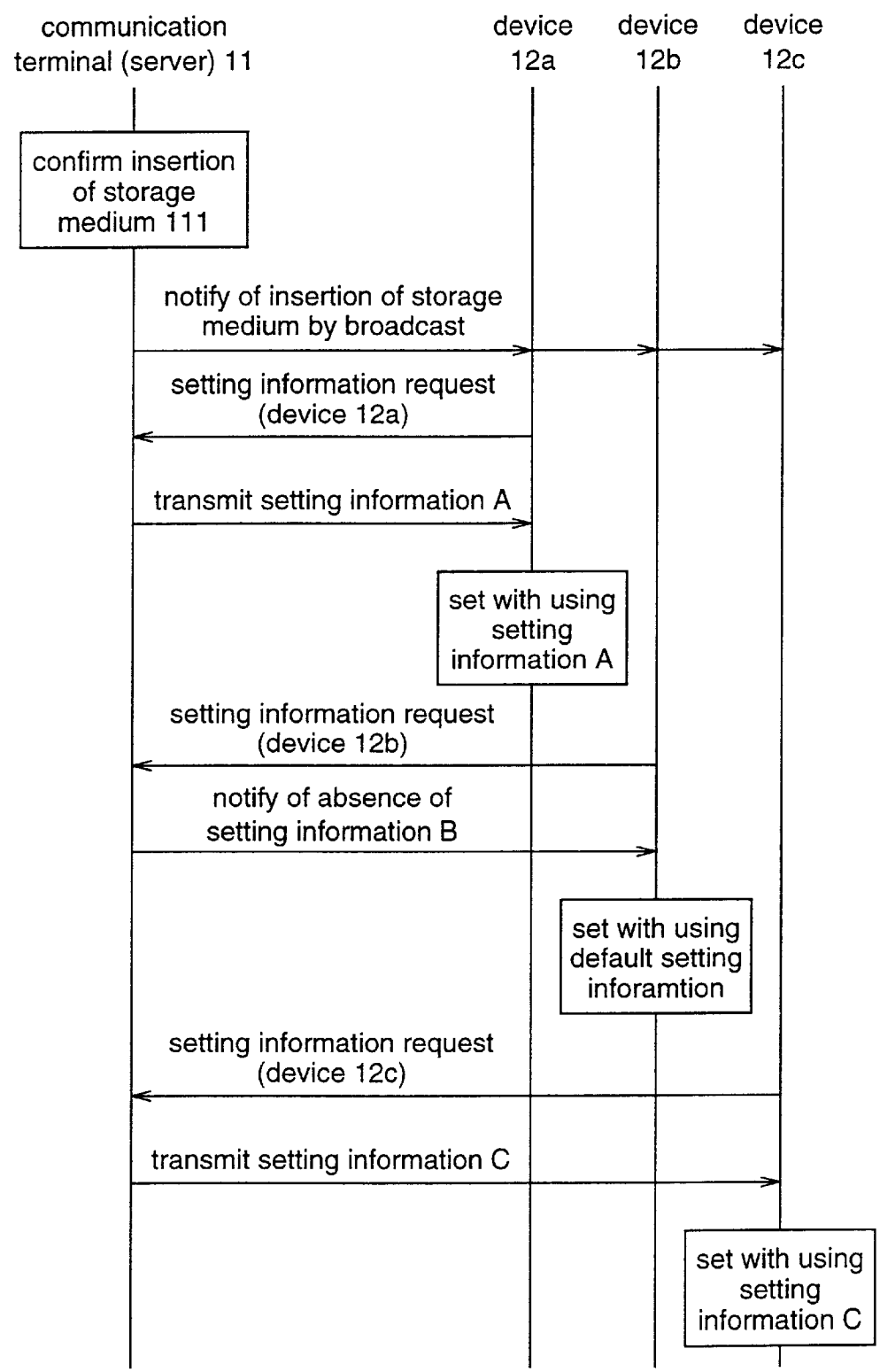
FIG. 15 is a diagram showing another example of the schematic sequence of the processing according to the first embodiment.

Further, as shown in FIG. 15, the communication system can be constructed so as to carry out the setting of the devices connected to the network 15, with the insertion of the storage medium 111 into the storage medium I/F 112 as a trigger. In this case, when the control means 113 detects that the storage medium 111 has been inserted into the storage medium I/F 112, the communication terminal (server) 11 transmits a message for notifying that the storage medium 111 has been inserted, to the network 15 by broadcast, and then each of the devices which has received the message transmits the setting information request to the communication terminal (server) 11. Then, the communication terminal (server) 11 transmits the setting information A and C to the devices 12a and 12c, respectively, and transmits the absence of the setting information B to the device 12b. Then, the devices 12a and 12c are set using the setting information A and C, respectively, and the device 12b is set using the default setting information.

It is also possible that, with the insertion of the storage medium 111 as a trigger, the communication terminal (server) 11 analyzes the setting information of the storage medium 111 and transmits the message to a target device.

The setting of the respective devices connected to the network 15 can be also carried out, with a request from a device connected to the network 15 as a trigger. In this case, it is possible that a device transmits a message for requesting the update of the setting information to the network 15 by broadcast and a device which has received the message transmits the setting information request with the receipt of the message as a trigger.

Figure 16:
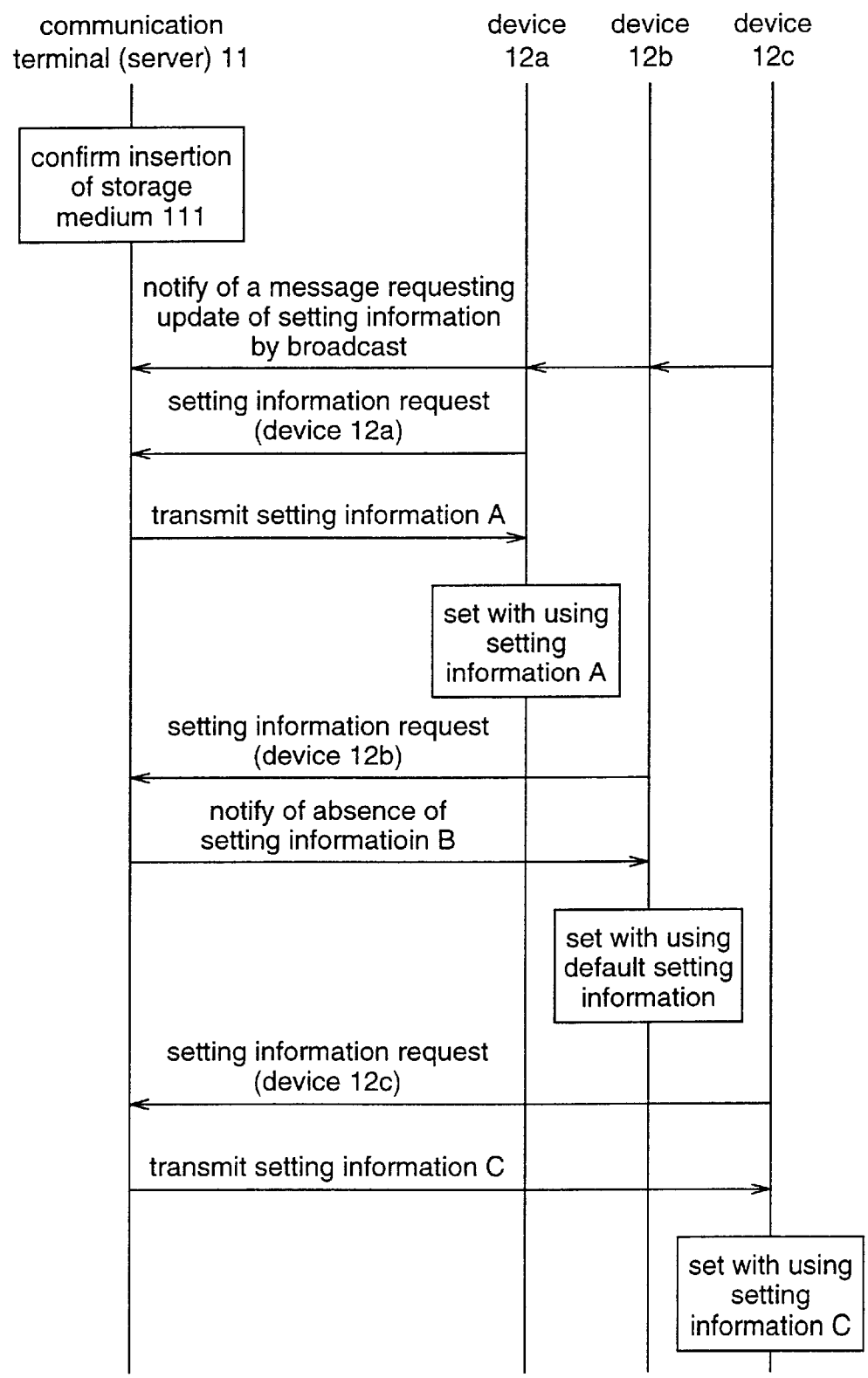
FIG. 16 is a diagram showing another example of the schematic sequence of the processing in the first embodiment.

Here, the operation in a case where the device 12c transmits the message by broadcast is described with reference to FIG. 16. In FIG. 16, assume that the device 12c is a sensor device for detecting the closing and opening of a door of a vehicle. When detecting that the door gets closed, the device 12c transmits a message for requesting the update of the setting information by broadcast. By doing so, the setting can be carried out again each time when the door gets closed. It goes without saying that the message for requesting the update of the setting information is not limited to the one transmitted by broadcast.

Figure 17:
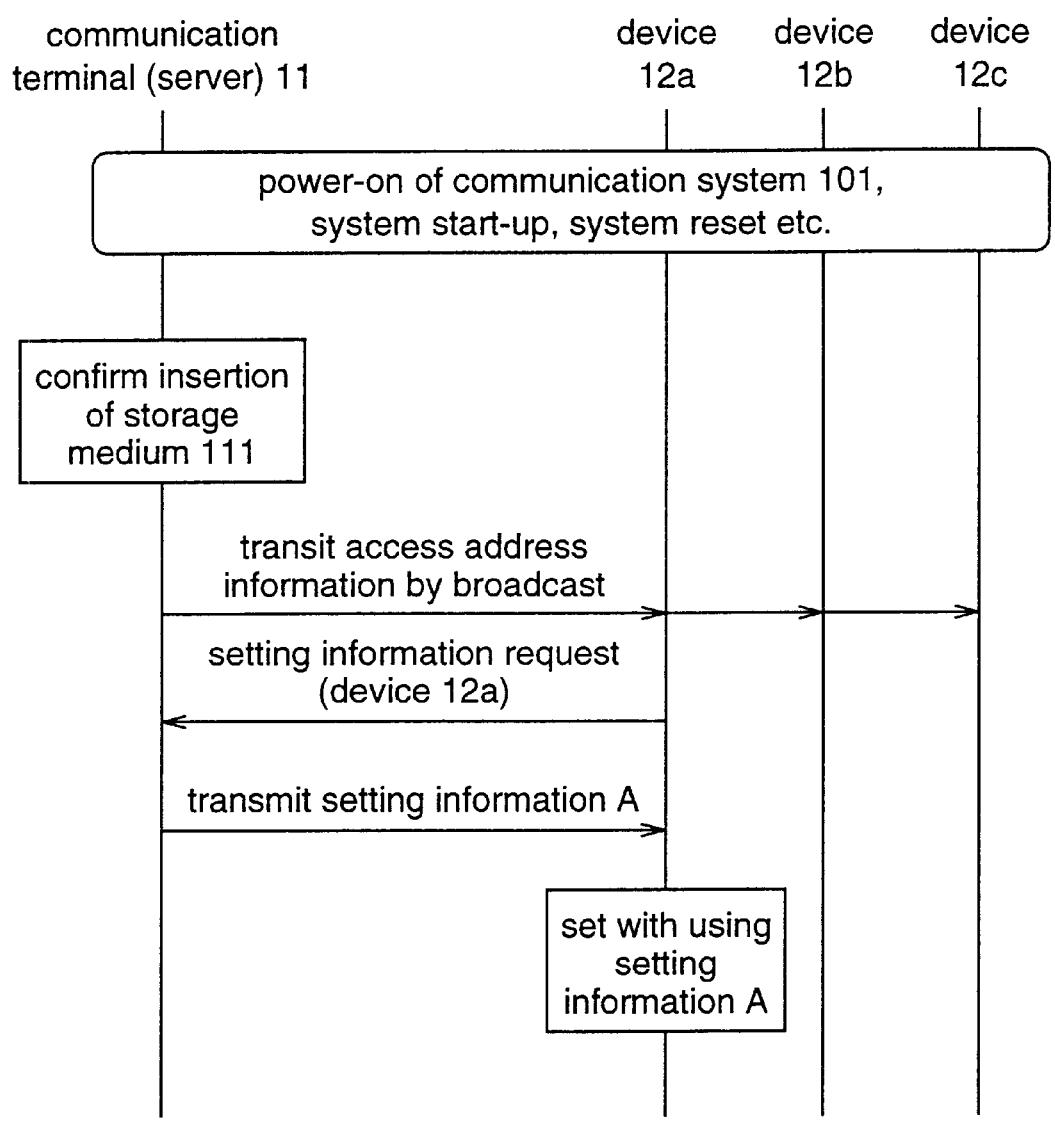
FIG. 17 is a diagram showing another example of the schematic sequence of the processing in the first embodiment.

The access address information 125 is not always required by the devices and can be dispensed with. For example, as shown in FIG. 17, the communication terminal (server) 11 can transmit the access address information for the storage medium 111 to the respective devices by broadcast, on the start-up or the insertion of the storage medium.

Further, it is also possible that the device for carrying out the setting transmits a query concerning the access address information to the storage medium 111 on the start-up by broadcast, and the communication terminal (server) 11 returns the access address information in response to the query.

Figure 18:
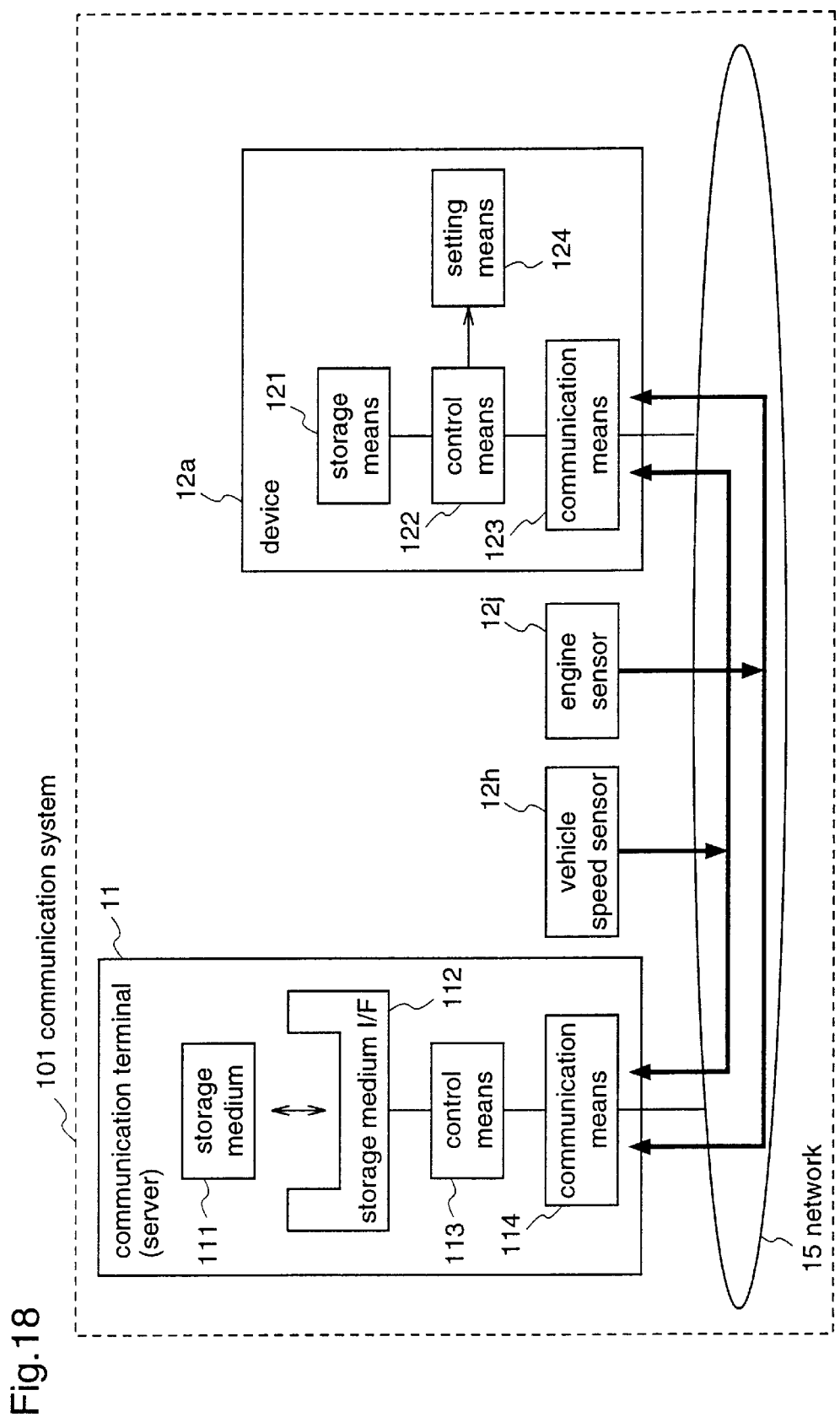
FIG. 18 is a diagram illustrating a structure of a system in a case where the setting operation is controlled in accordance with information of a vehicle speed sensor or engine sensor.

In the above-mentioned explanations, it is described that the setting operation can be executed with the insertion of the storage medium 111 into the storage medium I/F 112 as a trigger, while in the vehicle-mounted system, there are some cases where it is dangerous if the position of the seat or mirror is set again, such as when the vehicle is traveling. In these cases, as shown in FIG. 18, a vehicle speed sensor 12h for detecting the speed of the vehicle outputs vehicle speed information, then the device 12a (which is realized by a seat position control unit or the mirror position control unit or the like) receives the output information, and the setting operation is not executed in a case where the vehicle speed is higher than a prescribed speed. Further, it is also possible that the communication terminal (server) 11 receives the vehicle speed information output by the vehicle speed sensor, and the device setting information 115 is not transmitted when the vehicle speed is higher than the prescribed speed on the basis of the received vehicle speed information.

Further, execution or un-execution of the setting operation can be controlled not on the basis of the vehicle speed information but on the basis of whether the engine is working or not. In this case, as shown in FIG. 18, an engine sensor 12j for detecting whether the engine is started or not outputs status information of the engine, the device 12a which is realized by the seat position control unit or mirror position control unit or the like receives the status information and, when the engine is working, does not execute the setting operation. In addition, it is also possible not to transmit the device setting information 115 when the communication terminal (server) 11 receives the engine status information which is output by the engine sensor and detects that the engine is working.

The vehicle speed sensor 12h and the engine sensor 12j in this case are connected to the network 15, while these sensors can be connected directly to the communication terminal (server) 11 or the device 12a.

Further, the device setting information 115 is not limited to setting data concerning the device operation, and can be for example a program which can be executed by the control means 122 realized by the CPU, ROM, RAM and the like in the device 12a. In this case, it is possible that the device 12a temporarily stores the received program in the storage means 121 and the control means 122 executes the program. Further, the program can have a format which can be directly executed by the CPU or the like, or can be a JAVA script.

The respective devices (12a, 12b and 12c) can not only perform the reading of the information from the storage medium 111 but also perform writing of the information. For example, when the user updates the setting information of the device 12a, the device 12a can write the updated information in the storage medium 111. The timing of the writing can be updated each time when the setting is updated or at intervals of a prescribed period, or the writing can be performed collectively upon shut-down or sleep of the system. Thus, when the system is started up the next time, the setting of the respective devices can be executed in accordance with the setting information which has been changed the last time.

The information stored in the storage medium 111 can be not only the information for each device or each user but also information common to plural devices or plural users. Further, information inherent to a certain device, information common to plural devices, information common to all devices and the like can be included.

In a case where no data are stored in the storage medium 111, the storage medium 111 is inserted into the storage medium I/F 112 to perform the setting of the devices, and the present setting status is stored in the storage medium 111 by pushing a button provided in the communication terminal (server) 11, for example. By doing so, when the storage medium 111 is inserted into the storage medium I/F 112 again, the devices can be set in accordance with the last time setting information.

It is also possible that a stationary mass storage device such as a HDD (Hard Disk Drive) is separately provided in the communication terminal (server) 11, and different storage media are used according to types of data so as to store the setting information common to plural devices and the setting information common to plural users among the setting information in the HDD, and store only the setting varying with the devices or users in a removable storage medium such as a memory card. By doing so, the storage capacity of the memory card can be suppressed. Further, when the communication system is a vehicle-mounted communication system, it is also possible to store setting information for each vehicle in the HDD and store personal setting information in a memory card.

In this case, it is also possible to store an ID identifying a person and actual setting information for each person in the HDD provided in the communication terminal (server) 11 and store only the ID identifying the person in the storage medium 111. The communication terminal (server) 11 decides on the basis of the ID which personal setting information is to be enabled, and the following processes can be similarly carried out regarding the personal setting information which has been decided to be enabled as the setting information stored in the storage means.

In the above descriptions, a linkage control for plural devices can be realized utilizing the fact that the storage medium 111 is also a storage means which can be accessed commonly by the plural devices on the network, and its procedure is schematically described hereinafter.

Initially, a device (device 12a in this case) writes common setting information as the setting information common to the plural devices in the storage medium 111 of the communication terminal (server) 11. Then, after writing the common setting information, the device 12a transmits a message for requesting the update of the setting information to the network 15 by broadcast. The other devices 12b and 12c connected to the network 15 read the setting information in the storage medium 111 of the communication terminal (server) 11 upon receipt of the message. At this time, the devices 12b and 12c simultaneously read also the common setting information. Then, the devices 12b and 12c execute the setting operation in accordance with the read common setting information, whereby the devices 12a, 12b and 12c can operate in a linked manner.

When the communication system is to be mounted on a vehicle, specific examples of the common setting information are the vehicle speed information, the vehicle position information and the like. When the common setting information is the vehicle speed information, the device 12a is decided to be a speed meter and the device 12b is decided to be a control panel, thereby realizing such a linkage operation that the operation of the control panel device 12b is disabled when the vehicle speed is higher than the prescribed speed. Further, when the common setting information is the vehicle position information, the device 12a is decided to be a GPS (Global Positioning System) unit and the device 12b is decided to be a tuner unit, thereby realizing such a linkage operation that the device 12b changes frequency setting to suit the frequency of the broadcast station for each region in accordance with the position information.

In the communication system 101 according to the first embodiment, the device 12a connected to the network 15 reads the device setting information 115 from the storage medium 111 inserted into the storage medium I/F 112 of the communication terminal (server) 11 via the network 15 automatically, for example, with the start-up of the system or insertion of the storage medium as the trigger, and then the setting of the device 12a is performed on the basis of the setting information A read from the storage medium 111. Therefore, it is unnecessary that the user should carry out the setting of each device using a storage medium corresponding to each device of the devices connected to the network 15, as in the prior art, but the setting of the device 12a can be easily executed only by inserting the storage medium 111 into the communication terminal (server) 11 and further the devices connected to the network 15 other than the device 12a can be similarly set using one storage medium 111, whereby the operationality of the user is increased.

When the setting information B is not included in the device setting information 115 like in the case of the device 12b, or when the receipt of the device setting information 115 from the communication terminal (server) 11 fails, the setting operation by the user such as manual setting is not required, and the setting operation can be executed using the default setting information, whereby the operationality of the user is further increased.

Embodiment 2

Hereinafter, a communication system 102 according to the second embodiment is described.

Figure 19:
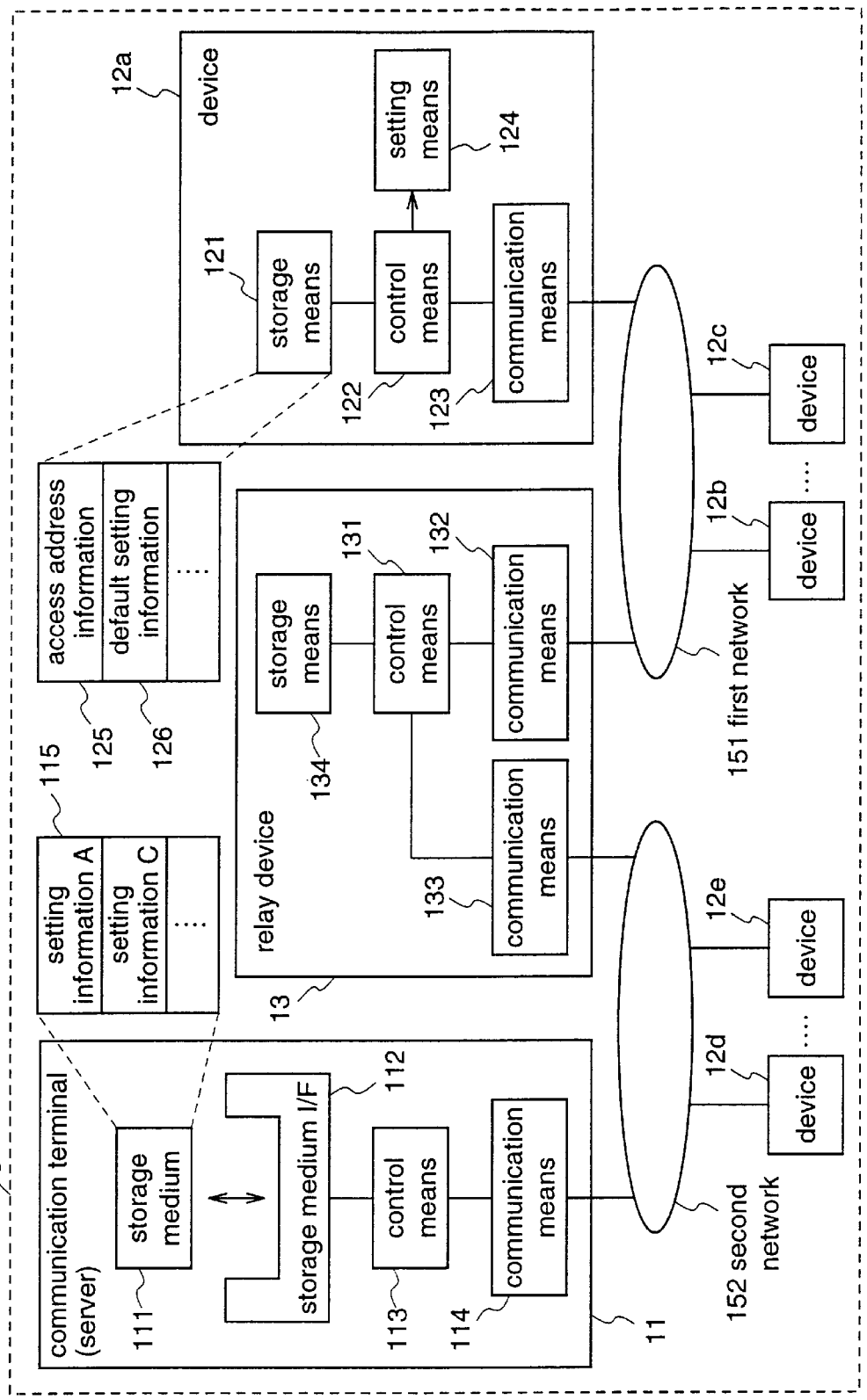
FIG. 19 is a diagram illustrating a communication system according to a second embodiment of the present invention.

FIG. 19 is a diagram illustrating the communication system 102 of the second embodiment.

In FIG. 19, numeral 151 denotes a first network and numeral 152 denotes a second network. Numeral 11 denotes a communication terminal (server). Numerals 12a, 12b, 12c, 12d and 12e denote devices, respectively. Numeral 13 denotes a relay device. The devices 12a, 12b and 12c are connected by the first network 151, respectively. The communication terminal (server) 11, and the devices 12d and 12e are connected by the second network 152, respectively. In addition, the first network 151 and the second network 152 are connected by the relay device 13. Here, the first and second networks 151 and 152 can also be different transmission media or communication protocols.

The relay device 13 comprises a control means 131, two communication means 132 and 133, and a storage means 134. The control means 131 controls the whole of the relay device 13. The storage means 134 contains routing information or packet transfer information utilized by the relay device 13. The communication means 132 provides a means for the relay device 13 to communicate with other devices via the first network 151, and includes a protocol controller chip of the first network 151, a transmission means, a receiving means and the like. The communication means 133 provides a means for the relay device 13 to communicate with other devices via the second network 152, and includes a protocol controller chip of the second network 152, a transmission means, a receiving means and the like.

In the normal data transmission, the relay device 13 transfers data addressed to the second network 152 among packet data in the first network 151 to the second network 152, and transfers data address to the first network 151 among packet data in the second network 152 to the first network 151, thereby realizing the communication between the first network 151 and the second network 152.

In FIG. 19, the same reference numerals as those in FIG. 1 denote the same or corresponding elements.

Figure 20:
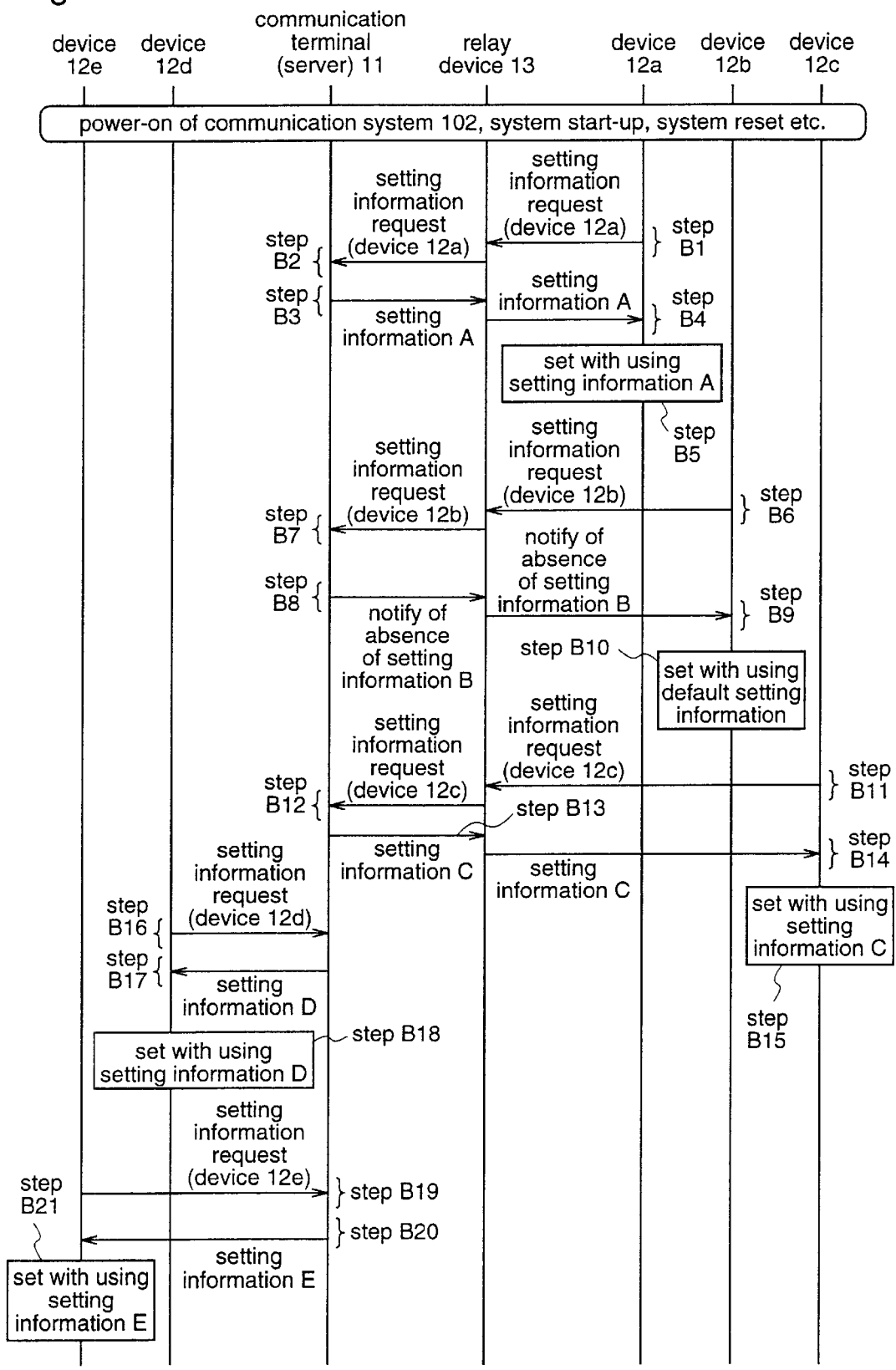
FIG. 20 is a diagram showing a schematic sequence of a processing according to the second embodiment.

The operation of the so-constructed communication system 102 is described with reference to FIG. 20.

Initially, in the communication system 102, when the power-on of the system, the system start-up, the system reset or the like occurs, the device 12a reads the access address information 125 stored in the storage means 121 using the control means 122 to create the setting information request, and transmits the same to the relay device 13 via the network 151 using the communication means 123 (step B1).

Here, the setting information request requests reading of setting information concerning the self-device (device 12a in this case) in the storage medium 111 of the communication terminal (server) 11.

Then, the relay device 13 receives the setting information request using the communication means 132, analyses the received setting information request using the control means 131, and transfers the request to the communication terminal (server) 11 via the second network 152 (step B2).

The transfer methods vary with types of the relay device 13 (gateway, router, bridge or the like).

For example, when the relay device 13 is a gateway device, the transfer process is executed in the seventh application layer of OSI (Open Systems Interconnection). Initially, the gateway relay device 13 extracts data from a received application layer packet and analyzes the contents by the control means 131. As a result of the analysis, when the relay device 13 recognizes that the data is a setting information request to the communication terminal (server) 11, the relay device 13 transmits the setting information request to the network 152. An example of the access address information 125 in this case can be a network address of the gateway relay device 13. In addition, the gateway device 13 can be registered so as to transfer the received data to the communication terminal (server) 11 when the data is the setting information request.

When the relay device 13 is a router device, the transfer process is executed in the third network layer of OSI. Here, the description is given, taking a case where the network protocol is an Internet protocol (hereinafter, abbreviated as IP) as an example. Initially, the router relay device 13 extracts a destination IP address of a received network layer packet (IP datagram in this case), analyzes the destination IP address using the control means 131, and retrieves a transfer destination table of the network layer stored in the storage means 134. Then, when recognizing that the transfer destination network of the destination address is the network 152, the relay device 13 carries out a required header processing and the like, and transfers the IP datagram to the network 152. An example of the access address information 125 in this case can be a network address (IP address) of the communication terminal (server) 11. In addition, in the router relay device 13, it can be registered in the transfer destination table of the network layer that the IP datagram addressed to the IP address of the communication terminal (server) 11 is transferred to the network 152.

When the relay device 13 is a bridge device, the transfer process is executed in the second data link layer of OSI. Initially, the bridge relay device 13 extracts a destination data link layer address of a received data link layer packet, analyzes the designation data link layer address using the control means 131 to retrieve a transfer destination table of the data link layer or the like. Then, when recognizing that the transfer destination network of the destination address is the network 152, the relay device 13 carries out a necessary processing and the like, and transfers the data link layer packet to the network 152. An example of the access address information 125 in this case can be a data link layer address of the communication terminal (server) 11. In addition, in the bridge relay device 13, it can be registered in the transfer destination table of the data link layer that the data link packet to the data link layer address of the communication terminal (server) 11 is transferred to the network 152.

The setting information request which has been transferred by the relay device 13 is transmitted via the second network 152, and received by the communication means 114 of the communication terminal (server) 11. Then, the control means 113 analyzes the contents of the received setting information request, controls the storage medium I/F 112 to retrieve the setting information A from the device setting information 115 stored in the storage medium 111, and transmits the setting information A to the relay device 13 via the second network 152 (step B3).

Then, the relay device 13 carries out a relay processing, and transmits the setting information A to the device 12a via the first network 151 (step B4). Here, the relay processing methods vary with the types of the relay device 13 (gateway, router, bridge or the like).

For example, when the relay device 13 is a gateway, the communication terminal (server) 11 transmits the setting information A to the relay device 13. The gateway relay device 13 extracts data of the application layer of the received packet, and analyzes the contents of the data using the control means 131. As a result of the analysis, when recognizing that the data is setting information to be transmitted to the device 12a, the relay device 13 transfers the setting information to the first network 151.

Examples of the method for analyzing the packet to decide the destination address at which the packet is to be transmitted, performed by the gateway relay device 13, are described below.

In the first method, respective device IDs (identifiers which can identify at least devices on the communication system 102) for the devices (devices 12a, 12b and 12c) and addresses (network address/data link layer address) are stored in the gateway relay device 13. The device ID is added to the setting information request and its response (setting information). The gateway relay device 13 sees the device ID added to the response (setting information) to decide an address to which the response is to be returned, and returns the response to the address.

In the second method, when the gateway relay device 13 has transferred the setting information request, the relay device 13 stores the return destination of an response corresponding to the request in a table or the like. In order to realize this, for example, a request ID (identifier which is unique to each setting information request) is added to each setting information request. When the gateway relay device 13 transfers the setting information request, the relay device 13 stores return destination address information and its request ID in pairs, in a table or the like. The return destination address can be the address of the transmission source of the request. Here, the return destination address is address information of the device 12a. The communication terminal (server) 11 adds the same request ID to the response (setting information) for the setting information request, and returns the response. When the gateway relay device 13 receives the response (setting information) for the setting information request, it retrieves the table from the request ID added to the response, and decides the transfer destination address.

Next, when the relay device 13 is a router, the communication terminal (server) 11 returns the IP datagram which designates the IP address of the device 12a as the destination IP address. The router relay device 13 extracts the destination IP address of the received IP datagram, analyzes the contents of the destination IP address using the control means 131, and retrieves the transfer destination table of the network layer or the like. Then, when the relay device 13 recognizes that the transfer destination network of the destination address is the network 151, the relay device 13 carries out a necessary header processing and the like, and transfers the IP datagram to the network 151. In the router relay device 13, it can be registered in the transfer destination table of the network layer that the IP datagram to the IP address of the device 12a is transferred to the network 15.

When the relay device 13 is a bridge, the communication terminal (server) 11 returns a data link layer packet which designates the data link layer address of the device 12a as the destination data link layer address. Then, the relay device 13 extracts the destination data link layer address of a received data link layer packet, analyzes the contents of the destination data link layer address using the control means 131, and retrieves a transfer destination table of the data link layer of the like. Then, when the relay device 13 recognizes that the transfer destination network of the destination address is the network 151, the relay device 13 carries out a necessary header processing and the like, and transfers the data link layer packet to the network 151. In the bridge relay device 13, it can be registered in the transfer destination table of the data link layer that the data link layer packet to the data link layer address of the device 12 is transferred to the network 151.

The setting information A transferred by the relay device 13 as described above is transmitted via the network 151, and received by the communication means 123 of the device 12a (step B4).

Then, the control means 122 transmits a control signal or setting information to the setting means 124 in accordance with the received setting information A. The setting means 124 carries out the setting of the device 12a by a method corresponding to the device 12a (step B5). When the device 12a cannot receive the setting information, the time-out processing is carried out after a prescribed time period and the setting is carried out utilizing the default setting information 126, as in the first embodiment.

The setting for the device 12a is completed as described above. The devices 12b and 12c are also set in the same manner. Further, the devices 12d and 12e are set in the same manner as the setting operation of each device in the communication system 101 of the first embodiment.

The device 12b transmits a setting information request to the relay device 13 via the first network 151 (step B6). Then, the relay device 13 receives the setting information request by the communication means 132, analyzes the received setting information request by the control means 131, and transfers the same to the communication terminal (server) 11 via the second network 152 (step B7). The communication terminal (server) 11 receives the setting information request by the communication means 114, analyzes the contents of the setting information request, and controls the storage medium I/F 112 to retrieve the setting information B from the device setting information 115 stored in the storage medium 111, by the control means 113. However, since the setting information B does not exist, the communication terminal (server) 11 notifies the relay device 13 of the absence of the setting information B via the second network 152 (step B8). Then, the relay device 13 carries out the relay processing, and transfers the notification to the device 12b via the first network 151 (step B9). Then, the device 12b which has been notified of the absence of the setting information B is set using the default setting information 126 (step B10).

The device 12c transmits a setting information request to the relay device 13 via the first network 151 (step B11). Then, the relay device 13 receives the setting information request by the communication means 132, analyzes the received setting information request by the control means 131, and transfers the same to the communication terminal (server) 11 via the second network 152 (step B12). The communication terminal (server) 11 receives the setting information request by the communication means 114, analyzes the contents of the setting information request and controls the storage medium IF 112 to retrieve the setting information C from the device setting information 115 stored in the storage medium 111, using the control means 113, and then transmits the setting information C to the relay device 13 via the second network 152 (step B13). Then, the relay device 13 carries out the relay processing, and transfers the setting information C to the device 12c via the first network 151 (step B14). Then, the device 12c is set in accordance with the setting information C (step B15).

The device 12d transmits a setting information request to the communication terminal (server) 11 via the second network 152 (step B16). Then, the communication terminal (server) 11 retrieves setting information D of the device 12d from the device setting information 115 stored in the storage medium 111, and transmits the setting information D to the device 12d via the second network 152 (step B17). Then, the device 12d is set in accordance with the setting information D (step B18).

The device 12e transmits a setting information request to the communication terminal (server) 11 via the second network 152 (step B19). Then, the communication terminal (server) 11 retrieves setting information E of the device 12e from the device setting information 115 stored in the storage medium 111, and transmits the setting information E to the device 12e via the second network 152 (step B20). Then, the device 12e is set in accordance with the setting information E (step B21).

As described above, the setting for all the devices on the communication system 102 is finished.

Figure 21:
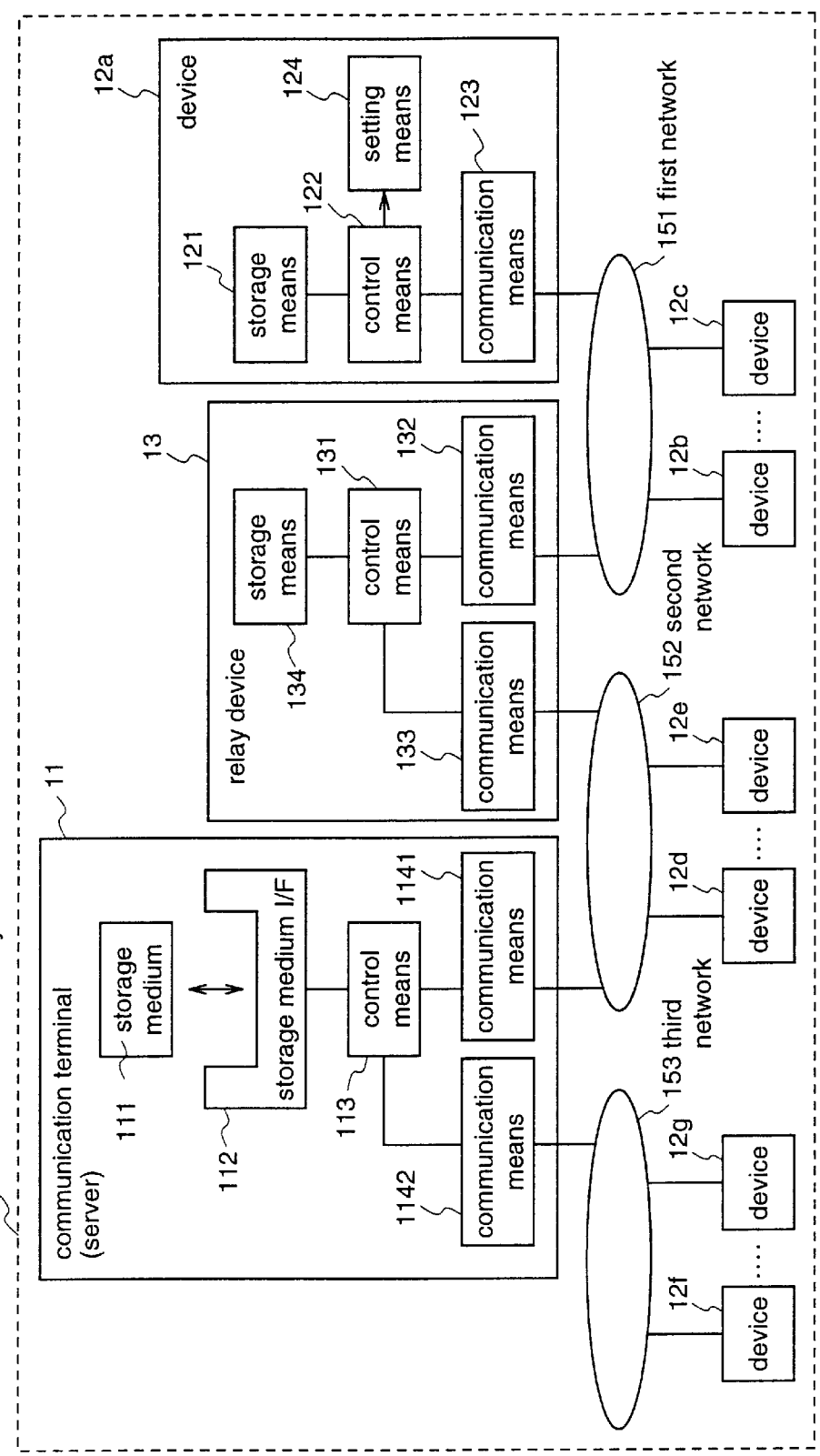
FIG. 21 is a diagram illustrating another structure of the communication system according to the second embodiment.

In this second embodiment, the communication terminal (server) 11 is a terminal which is connected to only one network 152. However, as shown in FIG. 21, the communication terminal (server) 11 can be utilized as a relay device. In FIG. 21, numerals 1141 and 1142 denote communication mean of the communication terminal (server) 11. Numeral 153 denotes a third network. Numerals 12g and 12f denote devices. The communication terminal (server) 11, and the devices 12g and 12f are connected by the third network 153, respectively. In FIG. 21, the same reference numerals as those in FIG. 19 denote the same or corresponding elements. In the communication system 103 in FIG. 21, the devices 12a, 12b, 12c, 12d and 12e can be set by the setting method as described in this second embodiment. In addition, the devices 12f, 12g, 12d and 12e can be set by the same setting method as that in the first embodiment.

In the second embodiment, the relay device 13 comprises two communication means, while the relay device 13 can have three or more communication means. In this case, it is decided which communication means among the plural communication means transfers a packet, using a transfer table stored in the storage means 134 or the like.

The procedure of the setting is not limited to the example as described in this embodiment. When the communication terminal (server) 11 is the one in the communication system 102 shown in FIG. 19, the message for notifying that the storage medium 111 has been inserted can be transmitted to the second network 152 by broadcast. When the communication terminal (server) 11 is the one in the communication system 103 shown in FIG. 21, this message can be transmitted to the second network 152 and the third network 153 by broadcast. In these cases, when the relay device 13 receives the message from the network 152, it transfers the message to the network 151 by broadcast. Though not shown but even if another relay device exists ahead, this relay device transfers the message in the same manner by broadcast. In this case, however, in order to prevent the packet from going round, it is desirable when the relay device receives the same message from plural communication means, not to carry out the transfer process for the second or later message.

In the communication system 102 according to the second embodiment, the communication between the plural devices 12a to 12c connected to the first network 151 and the communication terminal (server) 11 connected to the second network 152 is relayed by the relay device 13. Therefore, not only the setting of the devices 12d and 12e connected to the second network 152 but also the setting of the plural devices 12a to 12c connected to the first network 151 can be easily executed. In addition, when the storage medium 111 is exchanged, the setting of the devices 12a to 12e which are connected to the first network 151 and the second network 152 can be easily changed, whereby the operationality of the user is increased.

Embodiment 3

Hereinafter, a communication system 104 according to the third embodiment is described.

Figure 22:
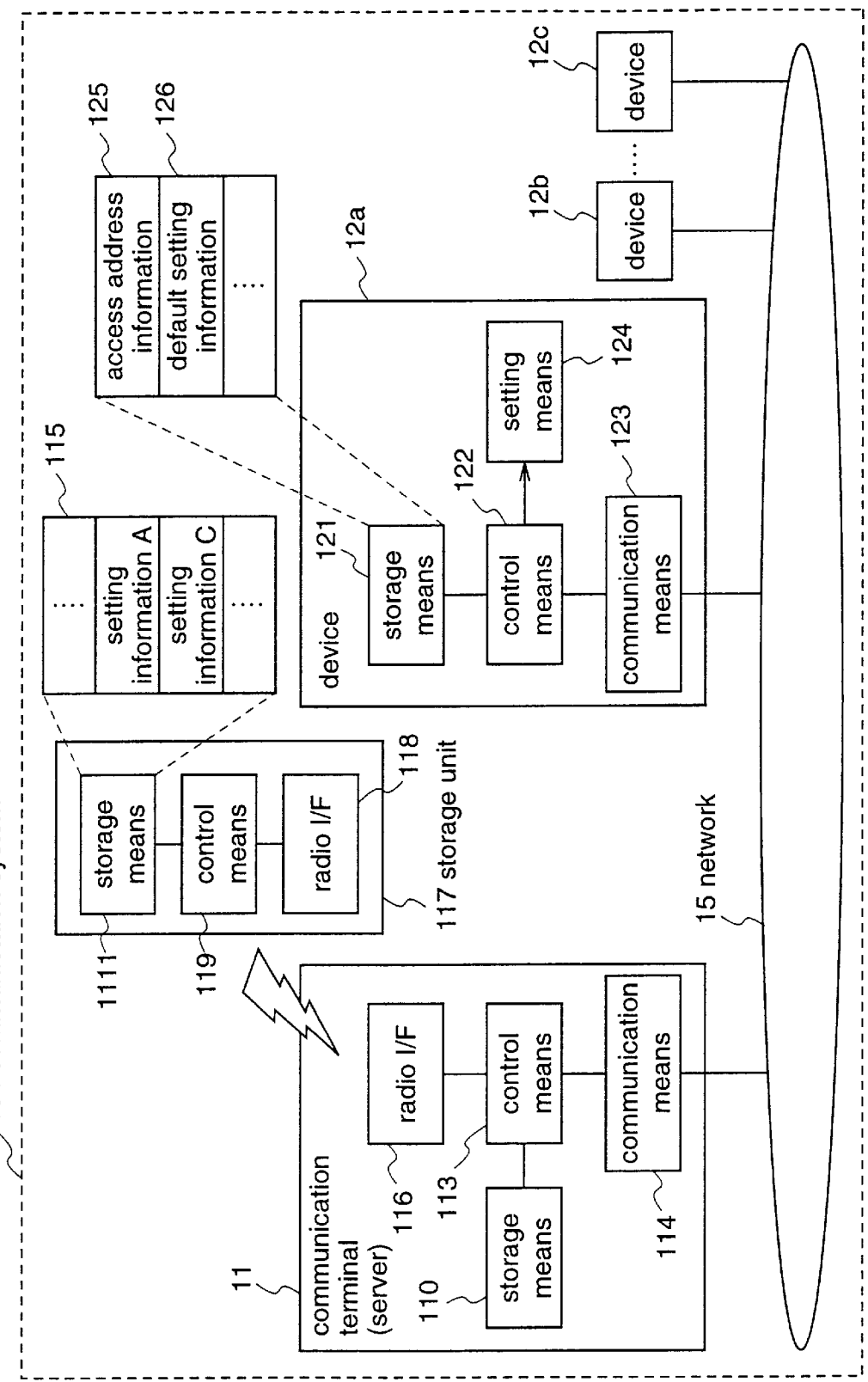
FIG. 22 is a diagram illustrating a communication system according to a third embodiment of the present invention.

FIG. 22 is a diagram illustrating the communication system 104 of the third embodiment.

In FIG. 22, the communication terminal (server) 11 comprises a storage means 110, a control means 113, a communication means 114, and a radio I/F (interface) 116. Here, the storage means 110 can be unremovable from the communication terminal (server) 11, and is realized by a memory or the like.

Numeral 117 denotes a storage unit which comprises a storage means 1111, a radio I/F (interface) 118, and a control means 119.

The storage means 1111 contains the device setting information 115, and is desirably realized by a SD memory card, a memory stick or the like. It can also be realized by an PCMCIA card, a compact flash, a flash memory, an IC card or the like.

The radio I/Fs 116 and 118 include an antenna, a transmitter-receiver and the like which are required for radio communication, and realize the radio communication. To be more specific, the radio I/F is desirably realized by a Bluetooth which uses a frequency band of 2.4 GHz, an IEEE802.11 or the like. Or, the radio I/F can be an IrDA as an infrared communication standard, or the like. The radio I/Fs 116 and 118 can correspond to plural I/Fs, respectively, while the radio I/Fs 116 and 118 include at least one I/F which is of the same type and they can communicate by radio each other.

The control means 119 controls reading and writing of data from and onto the storage means 111 and the radio communication by the radio I/F 118, and is realized by a CPU, a ROM, a RAM and the like.

In FIG. 22, the same reference numerals as those in FIG. 1 denote the same or corresponding elements.

Figure 23:
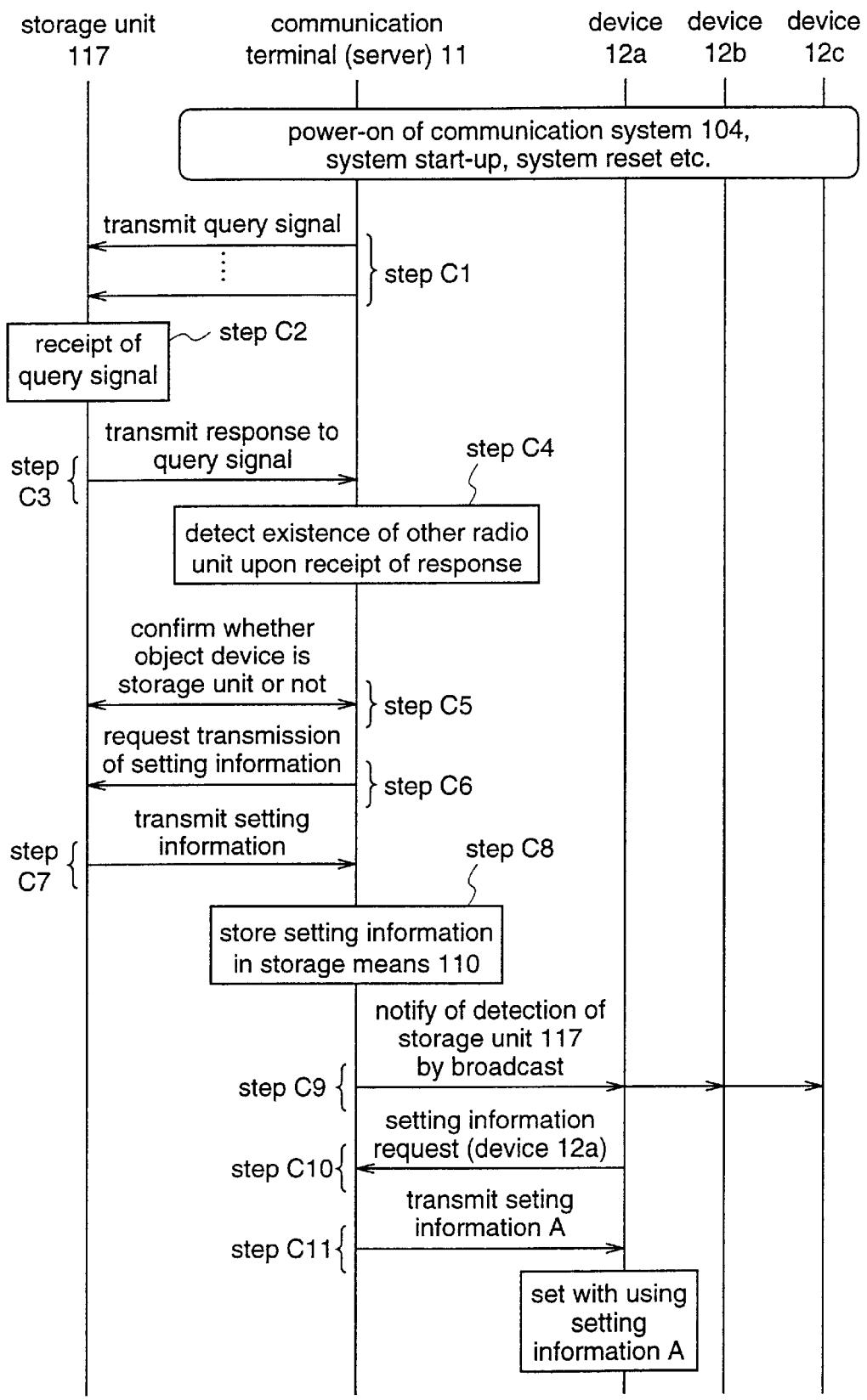
FIG. 23 is a diagram showing a schematic sequence of a processing according to the third embodiment.

The operation of the so-constructed communication system 104 is described with reference to FIG. 23.

Initially, in the communication system 104, when the power-on of the system, the system start-up, the system reset or the like occurs, the communication terminal (server) 11 starts transmission of a query signal (step C1). The query signal is repeatedly transmitted and desirably transmitted at intervals of a prescribed time period. The communication terminal (server) 11 transmits the query signal by means of the radio I/F 116, and retrieves whether other radio communication units exist in a communicable area by observing a response for the query.

The storage unit 117 observes the query signal from the communication terminal (server) 11, and retrieves whether a radio communication unit exists in the communicable area. When no radio communication unit exists in the communicable area, the communication terminal (server) 11 does not observe the response, but the communication terminal (server) 11 repeatedly transmits the query signal and continues the retrieval. Examples of the query can be realized by Inquiry or Page in the case of Bluetooth. In addition, when the storage unit 117 exists in an area where this unit 117 can communicate with the communication terminal (server) 11, the storage unit 117 receives the query signal (step C2).

Then, the storage unit 117 transmits a response signal for the received query signal (response to Inquiry or Page in the case of Bluetooth) to the communication terminal (server) 11 (step C3).

Then, when the communication terminal (server) 11 receives the response signal, it recognizes that a radio communication unit exists in the communicable area (step C4).

The communication terminal (server) 11 confirms whether the detected radio communication unit is a storage unit having a storage means 1111 or not, by communicating with the detected radio communication unit. This processing is confirmed by the communication between the control means 119 of the storage unit and the control means 113 of the communication terminal (server) 11 via the radio I/Fs 116 and 118 (step C5). The confirmation is made by such a confirmation method that a code indicating the type of a device is previously decided and then the storage unit 117 transmits a code indicating that the self-device is a device classified as the storage unit, to the communication terminal (server) 11.

Then, when the communication terminal (server) 11 has confirmed that the radio communication unit is a storage unit having the storage means 1111, it requests the transmission of the device setting information 115 stored in the storage means 1111 of the storage unit 117 (step C6).

Then, the storage unit 117 transmits the device setting information 115 to the communication terminal (server) 11 (step C7).

Then, the communication terminal (server) 11 stores the received device setting information 115 in the storage means 110 (step C8).

Then, the communication terminal (server) 11 transmits a message for notifying that the storage unit 117 which comprises the storage means 1111 having the device setting information 115 has been found, to the network 15 by broadcast (step C9).

Then, when the device 12a receives the message, it creates the setting information request and transmits the request via the network 15 (step C10). The communication terminal (server) 11 analyzes the contents of the setting information request, retrieves the setting information A from the device setting information 115 stored in the storage means 110, and transmits the setting information A to the device 12a via the network 15 (step C11). The device 12a is set in accordance with the setting information A transmitted as described above.

The system operation subsequent to step C8 can be the same as the operation after the insertion of the storage medium 111 in the first embodiment, and it is also possible that the communication terminal (server) 11 analyzes the setting information of the storage means 110 and transmits the message for notifying a target device of the fact that the storage means has been found, by multicast (addressed to plural devices) or unicast (addressed to one device).

It is also possible that the communication terminal (server) 11 analyzes the setting information of the storage means 110 and transmits the device setting information to a target device by broadcast (information common to all devices), multicast (information common to plural devices), or unicast (information unique to one device).

Figure 24:
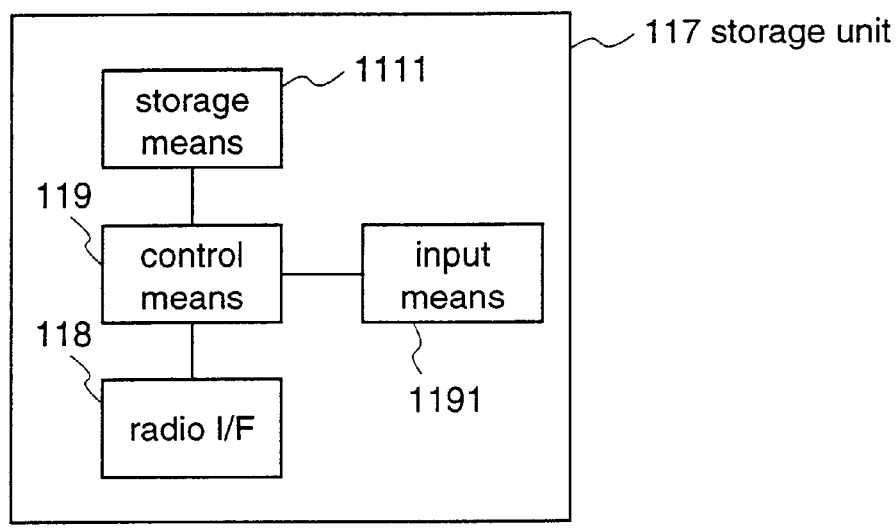
FIG. 24 is a diagram illustrating another structure of a storage unit 117 of the third embodiment.
Figure 25:
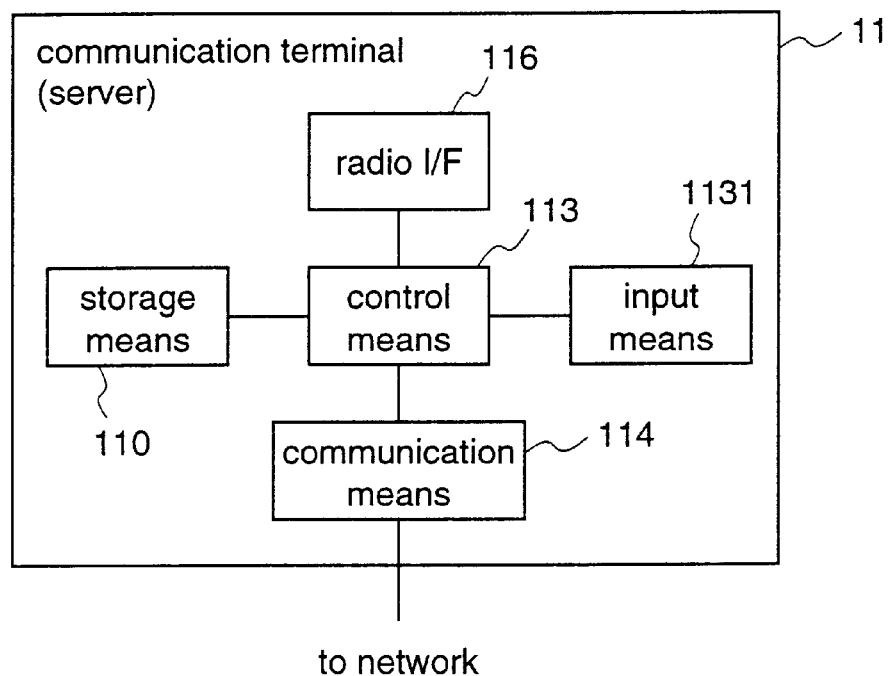
FIG. 25 is a diagram illustrating another structure of a communication terminal 11 of the third embodiment.

In the above descriptions, the communication terminal (server) 11 repeatedly transmits the query signal, while it is also possible that the query signal is transmitted from the storage unit 117 side. In this case, it is possible that an input means 1191 such as a button is provided in the storage unit 117 as shown in FIG. 24, and only when the user pushes the button 1191 the query signal is transmitted for a prescribed time period or prescribed times thereafter. It is also possible that an input means 1131 such as a button is provided in the communication terminal (server) 11 as shown in FIG. 25, and only when the user pushes the button 1131 the query signal is transmitted for a prescribed time period or prescribed times thereafter. By doing so, the consumed power can be reduced.

In the above descriptions, the setting operation is executed, with a timing when the communication between the communication terminal (server) 11 and the storage unit 117 becomes possible as a trigger. However, it is also possible, for example, to execute the operation with a timing when the communication between the communication terminal (server) 11 and the storage unit 117 becomes "impossible" as a trigger. The detection that the communication has become impossible can be judged from the fact that no response for the query which is periodically transmitted by the communication terminal (server) 11 to the storage unit 117 comes. Or, it can be judged that the communication is impossible when K-time responses do not come in response to N-time queries (N>K).

Figure 26:
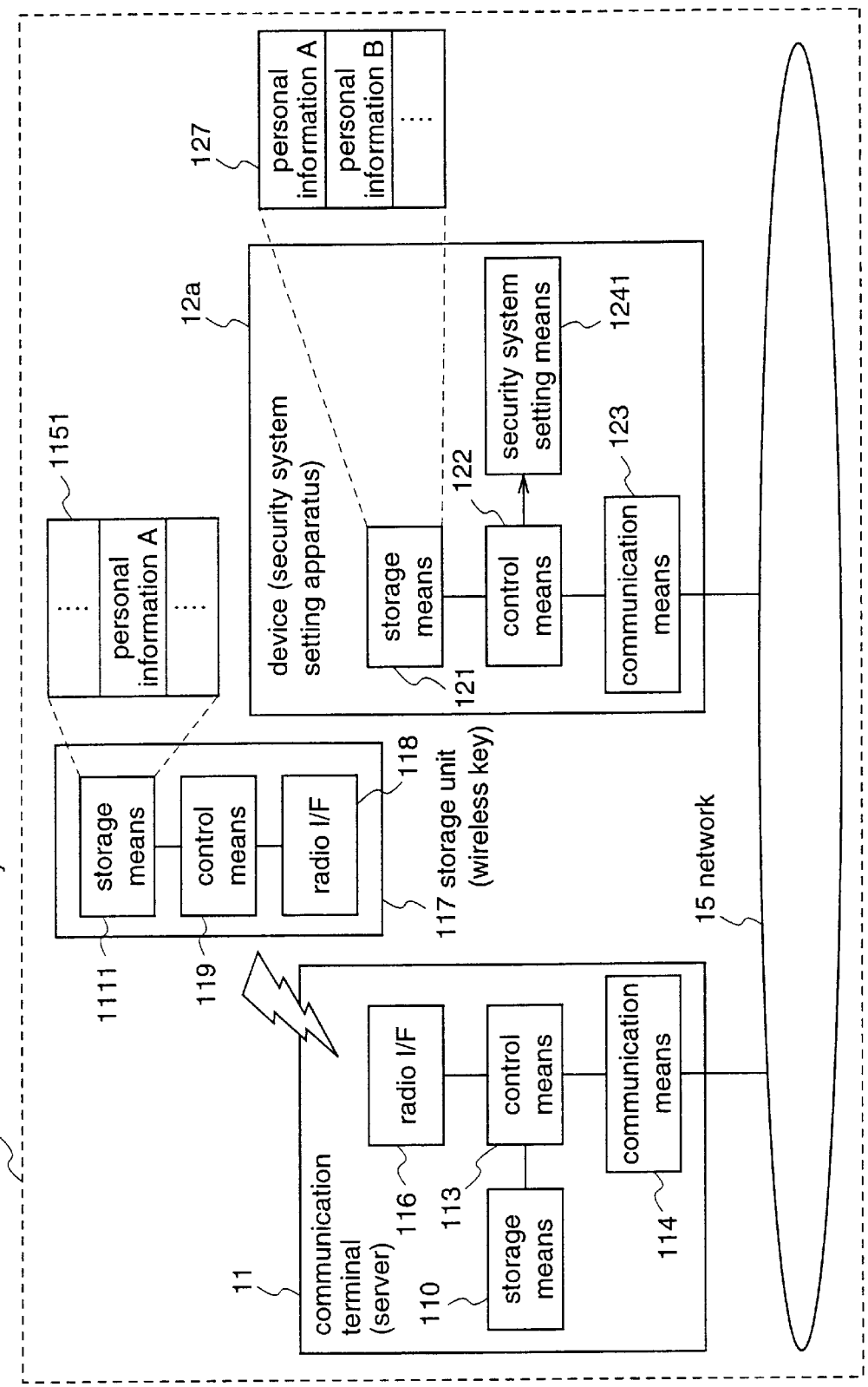
FIG. 26 is a diagram illustrating another structure of the communication system of the third embodiment.
Figure 27:
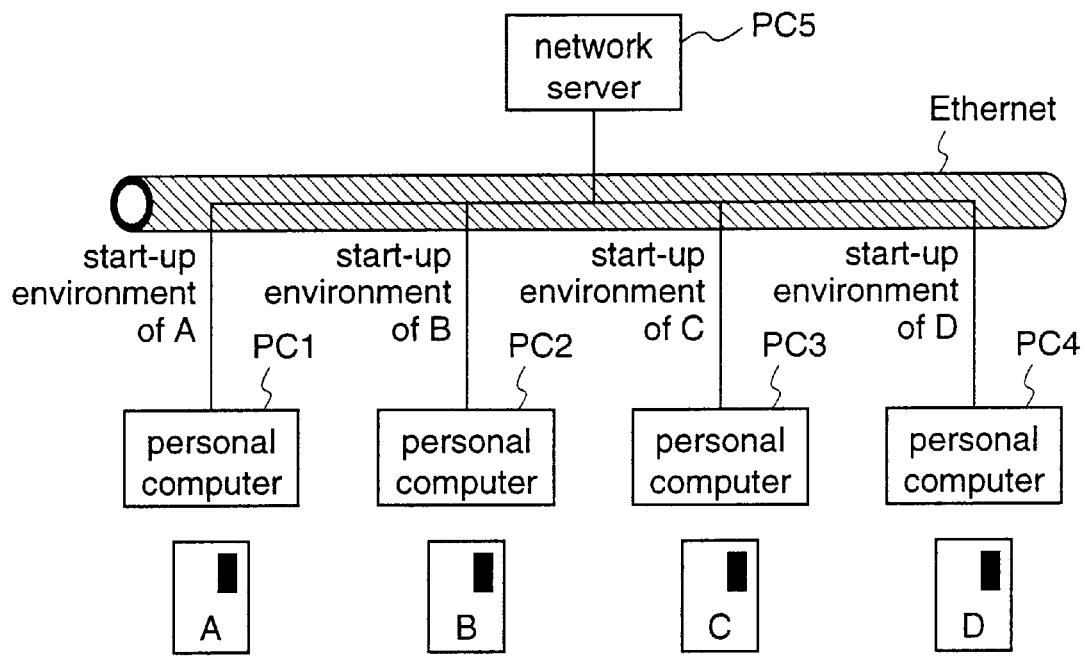
FIGS. 27(a) and 27(b) are diagrams for explaining a prior art.
Figure 27:
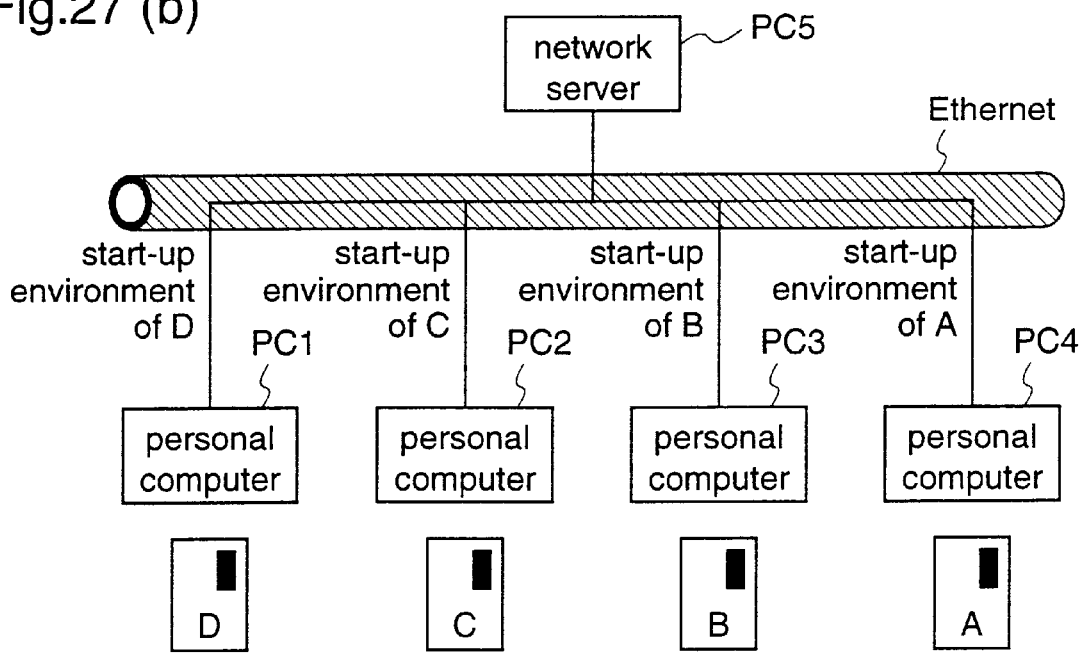

A case where personal information A 1151 is stored in the storage mean 1111 of the storage unit 117 like the vehicle-mounted communication system 105 shown in FIG. 26, and the device 12a is a device for setting a security system of a vehicle is described as an example. A security system setting means 1241 controls turning-on (start up)/turning-off (release) of the security system. The security system can be a device for detecting such facts that the vehicle starts running, the engine is cranked, vibrations are added or the door gets opened, and emitting a large sound, or constructed so as to send information by means of a self-contained portable phone or the like. Or, it can be constructed such that the engine cranks only when the security system is turned off (released).

In FIG. 26, the same reference numerals as those in FIG. 22 denote the same or corresponding elements.

Hereinafter, the operation of the communication system 105 is described.

Initially, when the communication terminal (server) 11 becomes communicable with the storage unit 117, it transmits the personal information 1151 A. When the device 12a has received the personal information 1151 A, the device 12a retrieves a personal information database 127 stored in the storage means 121 and examines whether the personal information 1151 A is personal information registered in the personal information database 127. When the information is registered, the security system is turned off.

When the communication with the storage unit 117 becomes impossible, the communication terminal (server) 11 transmits a message for notifying the effect to the device 12a. When the device 12a receives the message, the security system is turned on. With the above-mentioned structure, it can be easily realized that the security system is released (turned off) only when the normal user registered in the personal information database 127 is in a radio-communicable area which is at a prescribed distance from the vehicle. However, it is desirable to use a radio interface which has a relatively narrower radio-communicable area, like Bluetooth.

The storage unit 117 comprises the storage means 1111 and the radio I/F 118, and requires only that the personal information 1151 stored in the storage means 1111 can be communicated via the radio I/Fs 118 and 116. For example, the storage unit can be realized by providing a slot of a memory card and a Bluetooth interface in a portable phone. In this case, the storage unit 117 is a memory card inserted into the slot of the portable phone, and the radio interface is a Bluetooth interface.

When no data are stored in the storage means 1111 of the storage unit 117 such as a radio data card, writing setting is performed. For example in cases where the storage unit 117 is a wireless key, when the driver gets off the vehicle, the setting status at that time is stored in the storage means 1111 together with the key ID, whereby when the driver gets on the vehicle again, the setting status of each vehicle-mounted device can be set in the setting status before the driver gets off the vehicle.

In this case, it is also possible to store an ID identifying a person and actual setting information for each person in a stationary mass storage such as the HDD (Hard Disk Drive) separately provided in the communication terminal (server) 11 and store only the ID identifying the person in the storage means 1111 of the storage unit 117. The communication terminal (server) 11 decides on the basis of the ID which personal setting information is to be enabled, and the following processes can be similarly carried out regarding the personal setting information which has been decided to be enabled as the setting information stored in the storage means.

In the communication system 104 of the third embodiment, the communication terminal (server) 11 communicates with the storage unit 117 by radio, receives the device setting information 115 from the storage means 1111 of the storage unit 117, and stores the same in the storage means 110. The device 12a connected to the network 15 reads the device setting information 115 from the storage means 1111 of the storage unit 117 via the network 15 automatically, for example by bringing the storage unit 117 closer to an area in which the radio communication with the communication terminal (server) 11 is possible as a trigger, and carries out the setting of the device 12a on the basis of the setting information A read from the storage means 1111 of the storage unit 117. Therefore, it is unnecessary for the user to carry out the setting of each device using a storage medium corresponding to each of the devices connected to the network 15, like in the prior art. In addition, without inserting the storage medium 111 in the storage medium I/F like in the communication system shown in any of the first and second embodiments, the setting of the device 12a can be easily executed by merely bringing the storage unit 117 closer to an area in which the radio communication with the communication terminal (server) 11 is possible, and further the devices connected to the network 15 other than the device 12a can be similarly set by one storage unit 117, whereby the operationality of the user is increased.

Further, when the setting information B is not included in the device setting information 115 like in the case of the device 12b or when the receipt of the device setting information 115 from the communication terminal (server) 11 fails, the setting operation by the user such as the manual setting is not required, and the setting operation can be executed using the default setting information, whereby the operationality of the user is further increased.

What is claimed is:
1. A communication system comprising:
a channel;
a first device comprising a storage medium interface into which a storage medium can be inserted and from which the storage medium can be removed; and
a second device comprising: a control means for controlling reading of setting information of said second device from the storage medium inserted into said storage medium interface of said first device via said channel, and for controlling writing of setting information of said second device onto the storage medium of said first device via said channel; and
a setting means for carrying out setting of said second device based on the setting information of said second device read from the storage medium;
wherein:
said first device and said second device are connected by said channel; said first device and said second device establish communication via said channel; and
the setting information of said second device comprises device information which is information for setting an environment of said second device and which can be set and updated by a user.
2. A communication system comprising:
a channel;
a first device comprising a radio interface operable to establish radio communication with a storage medium which includes a radio interface; and
a second device comprising:
a control means for controlling reading of setting information of said second device from the storage medium via said radio interface of said first device, and for controlling writing of setting information of said second device onto the storage medium of said first device via said channel; and
a setting means for carrying out setting of said second device based on the setting information of said second device read from the storage medium;
wherein: said first device and said second device are connected by said channel;
said first device and said second device establish communication via said channel; and
the setting information of said second device comprises device information which is information for setting an environment of said second device and which can be set and updated by a user.
3. The communication system of claim 1 or 2 wherein said second device establishes communication with said first device via said channel, with start-up of said communication system as a trigger, and the setting of said second device is carried out based on the setting information of said second device read from the storage medium.
4. The communication system of claim 1 wherein said second device establishes communication with said first device via said channel, with insertion of the storage medium into said storage medium interface as a trigger, and the setting of said second device is carried out based on the setting information of said second device read from the storage medium.
5. The communication system of claim 2 wherein said second device establishes communication with said first device via said channel, with said first device and the storage medium becoming communicable by radio via said radio interface as a trigger, and the setting of said second device is carried out based on the setting information of said second device read from the storage medium.

6. The communication system of claim 2 wherein said second device establishes communication with said first device via said channel, with said first device and the storage medium becoming communicable by radio via said radio interface as a trigger, and the setting of said second device is carried out based on the setting information of said second device read from the storage medium, and the setting of said second device is released when said first device and the storage medium become incommunicable by radio via said radio interface as a trigger.

7. The communication system of claim 1 or 2 wherein said second device establishes communication with said first device via said channel, with receipt of a message from a third device connected to said channel, for requesting update of setting information as a trigger, and the setting of said second device is carried out based on the setting information of said second device read from the storage medium.

8. The communication system of claim 1 or 2 wherein when the setting of said second device according to the setting information of said second device read from the storage medium is updated by an operation of the user, said second device writes the setting information of said second device obtained by the setting being updated into the storage medium via said channel.

9. The communication system of claim 1 or 2 wherein the setting information of said second device stored in the storage medium includes setting information for each person.

10. The communication system of claim 1 or 2 wherein the setting information of said second device stored in the storage medium includes user interface setting information concerning setting of a user interface of a Human Machine Interface device, and when said second device is a Human Machine Interface device, said second device establishes communication with said first device via said channel, and the setting of said second device is carried out based on the user interface setting information which is included in the setting information of said second device read from the storage medium.

11. The communication system of claim 1 or 2 wherein the setting information of said second device stored in the storage medium includes voice recognition information concerning voice recognition for each person stored in a voice recognition device, and said second device is a voice recognition device, said second device establishes communication with said first device via said channel, and the setting of said second device is carried out based on the voice recognition information which is included in the setting information of said second device read from the storage medium.

12. The communication system of claim 1 or 2 wherein the setting information of said second device stored in the storage medium includes executable program information, and said second device establishes communication with said first device via said channel, and executes a program based on the program information which is included in the setting information of said second device read from the storage medium.

13. The communication system of claim 1 or 2 comprising a relay device which is connected to said channel and to a further channel different from said first channel, said relay device comprising plural communication means for establishing communications with said channel and said further channel, respectively, and a control means for controlling relay between said channel and said further channel.

14. The communication system of claim 1 or 2 wherein said first device is connected to said channel and to a further channel different from said channel, and performs relay between said channel and said further channel.

15. The communication system of claim 1 or 2 wherein the storage medium is a memory card.

16. The communication system of claim 1 or 2 wherein the storage medium is a PCMCIA card.

17. The communication system of claim 1 or 2 wherein the storage medium is an IC card.

18. A vehicle-mounted communication system comprising said communication system of claim 1 or 2 to be mounted on a vehicle, wherein said second device establishes communication with said first device via said channel, with turning-on of an ignition key or start-up of an engine of the vehicle as a trigger, and the setting of said second device is carried out based on the setting information of said second device read from the storage medium.

19. A vehicle-mounted communication system comprising said communication system of claim 1 or 2 to be mounted on a vehicle, wherein said first device or said second device analyzes contents of vehicle speed information transmitted from a vehicle speed sensor, and when recognizing that the vehicle speed is higher than a prescribed speed, controls the setting of said second device not to be carried out.

20. A vehicle-mounted communication system comprising said communication system of claim 1 or 2 to be mounted on a vehicle, wherein said first device or said second device analyzes contents of status information indicating an engine operation status transmitted from an engine sensor, and when recognizing that the engine is working, controls the setting of said second device not to be carried out.

21. A vehicle-mounted communication system comprising said communication system of claim 1 or 2 to be mounted on a vehicle, wherein the setting information of said second device stored in the storage medium includes seat position setting information concerning a seat position for each person, and said second device is a device for setting the seat position of the vehicle, said second device establishes communication with said first device via said channel, and the setting of said second device is carried out based on the seat position setting information which is included in the setting information read from the storage medium.

22. A vehicle-mounted communication system comprising said communication system of claim 1 or 2 to be mounted on a vehicle, wherein the setting information of said second device stored in the storage medium includes mirror position setting information concerning a mirror position of the vehicle for each person, and said second device is a device for setting the mirror position of the vehicle, said second device establishes communication with said first device via said channel, and the setting of said second device is carried out based on the mirror position setting information which is included in the setting information read from the storage medium.

23. A vehicle-mounted communication system comprising said communication system of claim 1 or 2 to be mounted on a vehicle, wherein
the setting information of said second device stored in the storage means includes handle position setting information concerning a handle position of the vehicle for each person, and
said second device is a device for setting a handle position of the vehicle, said second device establishes communication with said first device via said channel, and the setting of said second device is carried out based on the handle position setting information which is included in the setting information of said second device read from the storage medium.

24. A vehicle-mounted communication system comprising said communication system of claim 1 or 2 to be mounted on a vehicle, wherein
the setting information of said second device stored in the storage medium includes air conditioner setting information concerning an air conditioner environment for each person, and
said second device is an air conditioner device, said second device establishes communication with said first device via said channel, and the setting of said second device is carried out based on the air conditioner setting information of said second device which is included in the setting information read from the storage medium.

25. A vehicle-mounted communication system comprising said communication system of claim 1 or 2 to be mounted on a vehicle, wherein
the setting information of said second device stored in the storage medium includes car audio setting information concerning a car audio environment for each person, and
said second device is a car audio device, said second device establishes communication with said first device via said channel, and the setting of said second device is carried out based on the car audio setting information of said second device which is included in the setting information read from the storage medium.

26. A vehicle-mounted communication system comprising said communication system of claim 1 or 2 to be mounted on a vehicle, wherein
the setting information of said second device stored in the storage medium includes car navigator setting information concerning a car navigator environment for each person, and
said second device is a car navigator device, said second device establishes communication with said first device via said channel, and the setting of said second device is carried out based on the car navigator setting information which is included in the setting information of said second device read from the storage medium.

27. A communication device for establishing communication with a further device via a channel, said communication device comprising:
a storage medium interface into which a storage medium can be inserted and from which the storage medium can be removed;
a communication means for establishing communication with the further device via the channel; and
a control means for: controlling reading of setting information of the further device from the storage medium inserted into said storage medium interface;
receiving the setting information of the further device from the further device via the channel; and
controlling writing of the received setting information of the further device onto the storage medium;
wherein the setting information of the further device comprises device information which is information for setting an environment of the further device and which can be set and updated by a user.

28. The communication device of claim 27 wherein
said control means reads the setting information of the further device from the storage medium which has been inserted into said storage medium interface to transmit the setting information to the further device, with receipt of a message for requesting the setting information of the further device from the further device as a trigger.

29. The communication device of claim 27 wherein
said control means reads access address information to the storage medium which has been inserted into said storage medium interface to transmit the access address information to the further device, with start-up of the communication device as a trigger.

30. The communication device of claim 27, wherein
said control means reads the setting information of the further device from the storage medium which has been inserted into said storage medium interface to transmit the setting information to the further device, with start-up of the communication device as a trigger.

31. The communication device of claim 27 wherein
said control means transmits a message indicating that the storage medium has been inserted into said storage medium interface, to the further device, with the insertion of the storage medium into said storage medium interface as a trigger.

32. The communication device of claim 27 wherein
said control means reads the setting information of the further device from the storage medium which has been inserted into said storage medium interface to transmit the setting information of the further device to the further device, with the insertion of the storage medium into said storage medium interface as a trigger.

33. A communication device for establishing communication with a further device via a channel, said communication device comprising:
a radio interface for establishing radio communication with a storage medium having a radio interface;
a communication means for establishing communication with the further device via the channel; and
a control means for: controlling reading of setting information of the further device from the storage medium;
receiving the setting information of the further device from the further device via the channel; and
controlling writing of the received setting information of the further device onto the storage medium via said radio interface;
wherein the setting information of the further device comprises device information which is information for setting an environment of the further device and which can be set and updated by a user.

34. The communication device of claim 33 wherein
said control means transmits a message indicating that the storage medium has been found, to the further device, with a trigger being that radio communication becomes possible via the storage medium and said radio interface.

35. The communication device of claim 33 wherein
said control means reads the setting information of the further device from the storage medium via said radio interface to transmit the setting information of the further device to the further device, with a trigger being that radio communication becomes possible via the storage medium and said radio interface.

36. A vehicle-mounted device comprising said communication device of claim 27 or 33 to be mounted on a vehicle.

37. The vehicle-mounted device of claim 36 wherein
when vehicle speed information is received from a vehicle speed sensor by said communication means, said control means analyzes contents of the vehicle speed information and when recognizing that the vehicle speed is higher than a prescribed speed, controls the setting information of the further device read from the storage medium which has been inserted into said storage medium interface so as not to be transmitted to the further device.

38. The vehicle-mounted device of claim 36 wherein
when status information indicating an engine operation status is received from an engine sensor by said communication means, said control means analyzes contents of the status information and when recognizing that the engine is working, controls the setting information of the further device read from the storage medium which has been inserted into said storage medium interface so as not to be transmitted to the further device.

39. A communication device for establishing communication with a further device via a channel, said communication device comprising:
  a communication means for establishing communication with the further device via the channel;
  a control means for controlling reading of setting information of said communication device from the further device via the channel, and for controlling writing of the setting information of said communication device onto the further device via the channel; and
  a setting means for carrying out setting of said communication device based on the setting information of said communication device which is read from the further device and received by said communication means;
  wherein the setting information of said communication device comprises device information which is information for setting an environment of said communication device and which can be set and updated by a user, and when the setting of said communication device is obtained by being set or updated by the user into said communication device, said control means controls writing of the setting information of said communication device obtained by the setting updated by the user, onto the further device.

40. The communication device of claim 39 wherein
said control means creates a message for requesting the setting information to transmit the message to the further device, with start-up of said communication device as a trigger.

41. The communication device of claim 39 wherein
said control means creates a message for requesting access address information required for the communication with the further device to transmit the message by broadcast, with start-up of said communication device as a trigger, and
when said communication means receives the access address information from the further device, said communication means transmits a message for requesting setting information based on the access address information.

42. The communication device of claim 39 wherein
said communication means transmits a message for requesting setting information, with receipt of a message for requesting setting information from a third device which is connected to the channel as a trigger.

43. The communication device of claim 39 further comprising a default setting storage means for containing default setting information of said communication device, wherein
when said setting means receives setting information from the further device, said setting means carries out the setting of said communication device based on the setting information, and when said setting means receives no setting information from the further device, said setting means carries out the setting of said communication device based on the default setting information.

44. A vehicle-mounted device comprising said communication device of claim 39 to be mounted on a vehicle.

45. The vehicle-mounted device of claim 44 wherein
when vehicle speed information is received from a vehicle speed sensor by said communication means, said control means analyzes contents of the vehicle speed information and when recognizing that the vehicle speed is higher than a prescribed speed, controls said setting means so as not to execute the setting of said communication device.

46. The vehicle-mounted device of claim 44 wherein
when status information indicating an engine operation status is received from an engine sensor by said communication means, said control means analyzes contents of the status information and when recognizing that the engine is working, controls said setting means so as not to execute the setting of said communication device.

* * * * *